(12) United States Patent
Kalous

(10) Patent No.: US 12,481,742 B2
(45) Date of Patent: Nov. 25, 2025

(54) LOCKING DEVICE BIOMETRIC ACCESS

(71) Applicant: Master Lock Company LLC, Oak Creek, WI (US)

(72) Inventor: Scott Kalous, Oak Creek, WI (US)

(73) Assignee: Master Lock Company LLC, Oak Creek, WI (US)

( * ) Notice: Subject to any disclaimer, the term of this patent is extended or adjusted under 35 U.S.C. 154(b) by 0 days.

(21) Appl. No.: 18/589,317

(22) Filed: Feb. 27, 2024

(65) Prior Publication Data

US 2024/0330424 A1    Oct. 3, 2024

Related U.S. Application Data

(63) Continuation of application No. 17/690,896, filed on Mar. 9, 2022, now Pat. No. 11,947,649, which is a continuation of application No. 16/800,161, filed on Feb. 25, 2020, now Pat. No. 11,275,820.

(60) Provisional application No. 62/815,449, filed on Mar. 8, 2019.

(51) Int. Cl.
| | |
|---|---|
| *G06F 21/32* | (2013.01) |
| *G06F 21/35* | (2013.01) |
| *G06F 21/86* | (2013.01) |
| *G07C 9/00* | (2020.01) |
| *G07C 9/37* | (2020.01) |

(52) U.S. Cl.
CPC .............. *G06F 21/32* (2013.01); *G06F 21/35* (2013.01); *G06F 21/86* (2013.01); *G07C 9/00174* (2013.01); *G07C 9/37* (2020.01)

(58) Field of Classification Search
CPC .......... G06F 21/32; G06F 21/35; G06F 21/86; G06F 21/31; G07C 9/00174; G07C 9/37; G07C 2009/00841; G07C 9/00182; G07C 9/00563; G07C 9/00817; H04L 63/0435; H04L 63/10; H04L 63/0853; H04L 63/0861

See application file for complete search history.

(56) References Cited

U.S. PATENT DOCUMENTS

| | | |
|---|---|---|
| 7,734,068 B2 | 6/2010 | Fisher |
| 7,903,846 B2 | 3/2011 | Fisher |
| 7,941,664 B2 | 5/2011 | Wheeler et al. |

(Continued)

OTHER PUBLICATIONS

International Search Report corresponding to PCT Application No. PCT/US2020/019612 dated Apr. 28, 2020, 8 pages.

(Continued)

*Primary Examiner* — Aravind K Moorthy
(74) *Attorney, Agent, or Firm* — Foley & Lardner LLP

(57) ABSTRACT

An electronic locking device includes an electronically controllable locking mechanism, a memory, a wireless transceiver configured to communicate wirelessly with a user device to receive an encrypted package containing a biometric template corresponding to an authorized user, and a processor. The processor is configured to decrypt the encrypted package and store the biometric template in the memory, receive a biometric input corresponding to a user attempting to access the electronic locking device, determine if the biometric input matches the biometric template of the authorized user, and activate the electronically controllable locking mechanism in response to a determination that the biometric input matches the biometric template of the authorized user.

17 Claims, 18 Drawing Sheets

(56) References Cited

U.S. PATENT DOCUMENTS

| | | | |
|---|---|---|---|
| 8,533,486 B1* | 9/2013 | Stark | H04L 69/28 |
| | | | 726/28 |
| 8,533,815 B1* | 9/2013 | Upson | H04L 9/3226 |
| | | | 713/168 |
| 8,754,854 B1* | 6/2014 | Hamburgen | G06F 3/047 |
| | | | 345/169 |
| 8,997,191 B1* | 3/2015 | Stark | G06F 21/32 |
| | | | 726/19 |
| 9,019,207 B1* | 4/2015 | Hamburgen | G06F 1/169 |
| | | | 345/157 |
| 9,060,688 B2 | 6/2015 | Rowe | |
| 9,082,188 B2 | 7/2015 | Mueller et al. | |
| 9,122,856 B2 | 9/2015 | Litz et al. | |
| 9,292,916 B2 | 3/2016 | Rowe | |
| 9,487,398 B2 | 11/2016 | Rowe et al. | |
| 9,590,984 B2 | 3/2017 | Cronin | |
| 9,619,804 B1 | 4/2017 | Thatte et al. | |
| 9,805,534 B2 | 10/2017 | Ho et al. | |
| 9,822,553 B1* | 11/2017 | Ho | E05B 47/026 |
| 9,875,592 B1* | 1/2018 | Erickson | G07C 9/00563 |
| 9,876,788 B1 | 1/2018 | Ziraknejad et al. | |
| 9,886,617 B2 | 2/2018 | Rowe et al. | |
| 9,898,642 B2 | 2/2018 | Han et al. | |
| 9,934,373 B1 | 4/2018 | Ziraknejad et al. | |
| 9,996,999 B2 | 6/2018 | Conrad et al. | |
| 10,062,231 B2 | 8/2018 | Zastrow et al. | |
| 10,062,233 B1* | 8/2018 | Rogers | G07C 9/38 |
| 10,148,436 B2 | 12/2018 | Robison et al. | |
| 10,253,529 B1* | 4/2019 | McGinn | E05B 51/00 |
| 10,257,173 B2 | 4/2019 | Nicholls | |
| 10,380,813 B1* | 8/2019 | Edwards | G06F 3/017 |
| 10,422,163 B1* | 9/2019 | Cabral Herrera | E05B 67/22 |
| 11,201,873 B2* | 12/2021 | Zhong | G10L 17/08 |
| 11,275,820 B2* | 3/2022 | Kalous | G07C 9/00182 |
| 11,947,649 B2* | 4/2024 | Kalous | G06F 21/35 |
| 2001/0019302 A1 | 9/2001 | Yatsu et al. | |
| 2002/0034319 A1* | 3/2002 | Tumey | G06V 30/2504 |
| | | | 382/116 |
| 2003/0005337 A1* | 1/2003 | Poo | H04L 9/3231 |
| | | | 726/5 |
| 2003/0028769 A1 | 2/2003 | Martin | |
| 2003/0046540 A1 | 3/2003 | Nakamura et al. | |
| 2003/0105725 A1 | 6/2003 | Hoffman | |
| 2003/0141959 A1 | 7/2003 | Keogh et al. | |
| 2003/0167396 A1* | 9/2003 | Usui | G07C 9/00563 |
| | | | 713/186 |
| 2003/0173408 A1 | 9/2003 | Mosher et al. | |
| 2004/0021552 A1* | 2/2004 | Koo | G07C 9/257 |
| | | | 340/5.61 |
| 2004/0041690 A1 | 3/2004 | Yamagishi | |
| 2004/0075590 A1* | 4/2004 | Pearson | G06F 21/32 |
| | | | 340/5.83 |
| 2004/0078579 A1 | 4/2004 | Osada et al. | |
| 2004/0129716 A1* | 7/2004 | Naufel | G07F 11/62 |
| | | | 221/9 |
| 2004/0190756 A1* | 9/2004 | Kim | G07C 9/00563 |
| | | | 382/115 |
| 2004/0219902 A1 | 11/2004 | Lee et al. | |
| 2004/0255623 A1* | 12/2004 | Sun | E05B 67/22 |
| | | | 70/38 A |
| 2005/0057339 A1* | 3/2005 | Ikehara | G06F 21/83 |
| | | | 340/5.52 |
| 2005/0149742 A1* | 7/2005 | Weis | G07C 9/00563 |
| | | | 713/186 |
| 2005/0203856 A1* | 9/2005 | Russell | G06Q 20/3674 |
| | | | 705/67 |
| 2005/0213723 A1* | 9/2005 | Chung | H04M 3/42314 |
| | | | 379/201.06 |
| 2006/0064577 A1 | 3/2006 | Chiu et al. | |
| 2006/0149971 A1* | 7/2006 | Kozlay | G07C 9/37 |
| | | | 713/186 |
| 2007/0014407 A1 | 1/2007 | Narendra et al. | |
| 2007/0014408 A1 | 1/2007 | Narendra et al. | |
| 2007/0050632 A1* | 3/2007 | Matsuoka | G06F 21/88 |
| | | | 713/182 |
| 2007/0085655 A1* | 4/2007 | Wildman | G06V 40/63 |
| | | | 109/23 |
| 2007/0096870 A1* | 5/2007 | Fisher | G06V 40/12 |
| | | | 340/5.83 |
| 2007/0106892 A1 | 5/2007 | Engberg | |
| 2007/0118758 A1* | 5/2007 | Takahashi | G06F 21/305 |
| | | | 713/186 |
| 2008/0024272 A1 | 1/2008 | Fiske | |
| 2008/0061927 A1* | 3/2008 | Manton | G07C 9/00563 |
| | | | 340/5.7 |
| 2008/0087720 A1 | 4/2008 | Levitov | |
| 2009/0064296 A1 | 3/2009 | Aikawa et al. | |
| 2009/0079540 A1* | 3/2009 | Grafeev | G06F 21/32 |
| | | | 340/5.83 |
| 2009/0150992 A1* | 6/2009 | Kellas-Dicks | G06F 21/316 |
| | | | 726/19 |
| 2009/0157537 A1* | 6/2009 | Miller | G06Q 10/109 |
| | | | 348/161 |
| 2009/0164797 A1 | 6/2009 | Kramer | |
| 2009/0203355 A1 | 8/2009 | Clark | |
| 2010/0005314 A1 | 1/2010 | Johnson et al. | |
| 2010/0042835 A1* | 2/2010 | Lee | H04W 12/065 |
| | | | 713/168 |
| 2010/0070419 A1 | 3/2010 | Vadhri | |
| 2010/0138667 A1 | 6/2010 | Adams et al. | |
| 2010/0156594 A1* | 6/2010 | Chaikin | G07C 9/00563 |
| | | | 70/283.1 |
| 2010/0158327 A1* | 6/2010 | Kangas | G06F 21/32 |
| | | | 382/124 |
| 2010/0205425 A1 | 8/2010 | Takacs et al. | |
| 2010/0205658 A1 | 8/2010 | Griffin | |
| 2010/0299530 A1 | 11/2010 | Bell et al. | |
| 2010/0327054 A1 | 12/2010 | Hammad | |
| 2011/0016317 A1 | 1/2011 | Abe | |
| 2011/0153497 A1* | 6/2011 | Determan | H04L 63/0861 |
| | | | 345/163 |
| 2011/0199183 A1 | 8/2011 | Marsden | |
| 2011/0235807 A1* | 9/2011 | Hayashi | H04R 5/04 |
| | | | 381/17 |
| 2012/0014569 A1 | 1/2012 | Frye et al. | |
| 2013/0025511 A1* | 1/2013 | Maxwell | E05G 1/04 |
| | | | 109/59 R |
| 2013/0042111 A1 | 2/2013 | Fiske | |
| 2013/0046542 A1 | 2/2013 | Papakipos et al. | |
| 2013/0103810 A1 | 4/2013 | Papakipos et al. | |
| 2013/0114863 A1* | 5/2013 | Kamata | G06V 40/50 |
| | | | 382/115 |
| 2013/0318361 A1 | 11/2013 | Erickson et al. | |
| 2013/0339018 A1 | 12/2013 | Scheffer et al. | |
| 2014/0101453 A1 | 4/2014 | Senthurpandi | |
| 2014/0104173 A1* | 4/2014 | Bruno | G06F 21/83 |
| | | | 345/168 |
| 2014/0250956 A1* | 9/2014 | Chong | G07C 9/00944 |
| | | | 70/278.1 |
| 2014/0267740 A1* | 9/2014 | Almomani | G07C 9/00182 |
| | | | 348/156 |
| 2014/0289519 A1 | 9/2014 | York | |
| 2015/0010217 A1* | 1/2015 | Aoki | G06V 40/70 |
| | | | 382/124 |
| 2015/0040212 A1 | 2/2015 | Kim et al. | |
| 2015/0067786 A1 | 3/2015 | Fiske | |
| 2015/0127965 A1* | 5/2015 | Hong | H04L 9/3231 |
| | | | 713/323 |
| 2015/0146945 A1 | 5/2015 | Han et al. | |
| 2015/0178346 A1 | 6/2015 | Bailey et al. | |
| 2015/0220742 A1 | 8/2015 | Ouyang et al. | |
| 2015/0235055 A1 | 8/2015 | An et al. | |
| 2016/0019215 A1 | 1/2016 | Murphey et al. | |
| 2016/0036788 A1 | 2/2016 | Conrad et al. | |
| 2016/0055694 A1* | 2/2016 | Saeedi | G07C 9/27 |
| | | | 340/5.52 |
| 2016/0055695 A1 | 2/2016 | Saeedi et al. | |
| 2016/0117878 A1 | 4/2016 | Pececnik | |
| 2016/0121672 A1* | 5/2016 | Budge | B60D 1/60 |
| | | | 280/507 |

(56) References Cited

U.S. PATENT DOCUMENTS

| | | | |
|---|---|---|---|
| 2016/0123040 A1* | 5/2016 | Hanson | E05B 67/38 |
| | | | 70/56 |
| 2016/0149906 A1 | 5/2016 | Yamada | |
| 2016/0180618 A1 | 6/2016 | Ho et al. | |
| 2016/0306965 A1 | 10/2016 | Iyer et al. | |
| 2016/0308841 A1 | 10/2016 | Singhvi | |
| 2016/0316367 A1 | 10/2016 | Rose et al. | |
| 2016/0323273 A1* | 11/2016 | Aufderheide, Jr. | |
| | | | H04L 63/0861 |
| 2016/0323274 A1* | 11/2016 | Chandrasekaran | G06Q 20/20 |
| 2016/0360351 A1* | 12/2016 | Cabouli | H04M 1/72412 |
| 2016/0364559 A1 | 12/2016 | Bali et al. | |
| 2017/0053467 A1* | 2/2017 | Meganck | G07C 9/00563 |
| 2017/0063851 A1* | 3/2017 | Kim | H04W 12/065 |
| 2017/0074012 A1* | 3/2017 | Onorato | E05C 1/10 |
| 2017/0109950 A1 | 4/2017 | Bacco et al. | |
| 2017/0114570 A1* | 4/2017 | Hallett | G07C 9/33 |
| 2017/0150813 A1* | 6/2017 | Stares | A47B 67/04 |
| 2017/0161978 A1 | 6/2017 | Wishne | |
| 2017/0180539 A1* | 6/2017 | Payack, Jr. | H04M 1/72415 |
| 2017/0213471 A1 | 7/2017 | Breed | |
| 2017/0255942 A1* | 9/2017 | Chandrasekaran | G06F 21/32 |
| 2017/0301166 A1* | 10/2017 | Earles | G07C 9/00309 |
| 2017/0344804 A1* | 11/2017 | Zhou | G06V 40/12 |
| 2017/0346803 A1 | 11/2017 | Ignatchenko et al. | |
| 2018/0003227 A1 | 1/2018 | Gerrit-Jan et al. | |
| 2018/0004990 A1 | 1/2018 | Martinez De Velasco Cortina et al. | |
| 2018/0070753 A1* | 3/2018 | Eveloff | H04W 4/025 |
| 2018/0091505 A1 | 3/2018 | Farrell et al. | |
| 2018/0108192 A1 | 4/2018 | Ho et al. | |
| 2018/0108228 A1* | 4/2018 | Lovejoy | G08B 13/08 |
| 2018/0124343 A1 | 5/2018 | Vogelsang et al. | |
| 2018/0158551 A1 | 6/2018 | Bradley et al. | |
| 2018/0167387 A1* | 6/2018 | Bhatt | G06Q 20/40145 |
| 2018/0167394 A1* | 6/2018 | High | H04L 63/123 |
| 2018/0260617 A1 | 9/2018 | Jones et al. | |
| 2018/0276465 A1 | 9/2018 | Lee et al. | |
| 2018/0276519 A1* | 9/2018 | Benkley, III | G06F 21/45 |
| 2018/0322716 A1 | 11/2018 | Belhadia et al. | |
| 2018/0322718 A1* | 11/2018 | Qian | G07C 9/00571 |
| 2018/0323632 A1* | 11/2018 | Astarabadi | E05B 47/0012 |
| 2018/0352440 A1 | 12/2018 | Ballard et al. | |
| 2018/0373919 A1 | 12/2018 | Wong | |
| 2019/0040655 A1* | 2/2019 | Chang | E05B 45/06 |
| 2019/0095655 A1 | 3/2019 | Krawczewicz et al. | |
| 2019/0156607 A1* | 5/2019 | Tao | E05B 67/22 |
| 2019/0172047 A1 | 6/2019 | Tan et al. | |
| 2019/0172281 A1 | 6/2019 | Einberg et al. | |
| 2019/0179438 A1* | 6/2019 | Benkley, III | G06F 3/044 |
| 2019/0180543 A1* | 6/2019 | Tewksbury | E05B 47/0001 |
| 2019/0188508 A1 | 6/2019 | Zebley et al. | |
| 2019/0206165 A1 | 7/2019 | Chang et al. | |
| 2019/0259231 A1 | 8/2019 | Mukundala et al. | |
| 2019/0264465 A1* | 8/2019 | Adje | E05B 47/026 |
| 2019/0304227 A1 | 10/2019 | Chen | |
| 2019/0327228 A1 | 10/2019 | Pantfoerder et al. | |
| 2019/0347884 A1 | 11/2019 | Kolb et al. | |
| 2019/0349354 A1* | 11/2019 | Baumgarte | H04L 9/3228 |
| 2019/0364023 A1 | 11/2019 | Marquardt et al. | |
| 2020/0043271 A1 | 2/2020 | Anderson et al. | |
| 2020/0082062 A1 | 3/2020 | Mequanint et al. | |
| 2020/0082656 A1 | 3/2020 | Pan et al. | |
| 2020/0090255 A1* | 3/2020 | Rodriguez Bravo | G01W 1/10 |
| 2020/0098207 A1 | 3/2020 | Liao | |
| 2020/0104472 A1 | 4/2020 | Aronowitz | |
| 2020/0186522 A1 | 6/2020 | Apturkar et al. | |
| 2020/0254974 A1 | 8/2020 | Gordon et al. | |
| 2020/0293643 A1 | 9/2020 | Wang | |
| 2020/0334364 A1 | 10/2020 | Haroldsen | |
| 2021/0021415 A1 | 1/2021 | Fung | |

OTHER PUBLICATIONS

Non-Final Office Action on U.S. Appl. No. 16/800,161 dated Jan. 1, 2021.

Non-Final Office Action on U.S. Appl. No. 17/690,896 Dtd Jun. 16, 2023.

Notice of Allowance on U.S. Appl. No. 17/690,896 Dtd Nov. 27, 2023.

US Notice of Allowance on U.S. Appl. No. 16/800,161 dated Nov. 8, 2021.

US Office Action on U.S. Appl. No. 16/800,161 dated Jul. 23, 2021.

* cited by examiner

LOCKING DEVICE BIOMETRIC ACCESS

CROSS-REFERENCE TO RELATED PATENT APPLICATIONS

This application is a continuation of U.S. patent application Ser. No. 17/690,896, filed Mar. 9, 2022, which is a continuation of U.S. patent application Ser. No. 16/800,161, filed Feb. 25, 2020, which claims the benefit of U.S. Provisional Application No. 62/815,449, filed Mar. 8, 2019, both of which are incorporated herein by reference in their entireties.

BACKGROUND

Recently, electronic locks have become commercially available. Such electronic locks may be capable of comparing a biometric input (e.g., a fingerprint, etc.) from a user against a biometric template to verify that the user has access to the lock. However, the process of providing the biometric template to the lock can be cumbersome, especially when the user requires access to multiple locks.

SUMMARY

Disclosed herein are methods and devices for managing access to locking devices. One embodiment relates to a lock system including an electronic locking device. The electronic locking device includes an electronically controllable locking mechanism, a memory, a wireless transceiver configured to communicate wirelessly with a user device to receive an encrypted package containing a biometric template corresponding to an authorized user, and a processor. The processor is configured to decrypt the encrypted package and store the biometric template in the memory, receive a biometric input corresponding to a user attempting to access the electronic locking device, determine if the biometric input matches the biometric template of the authorized user, and activate the electronically controllable locking mechanism in response to a determination that the biometric input matches the biometric template of the authorized user.

Another embodiment relates to a lock system including an electronic locking device and a non-transitory computer-readable medium having computer-executable instructions encoded therein and stored by a second processor of a user device. The electronic locking device includes an electronically controllable locking mechanism, a wireless transceiver configured to communicate wirelessly with the user device, a memory configured to store biometric templates corresponding to authorized users, and a first processor. The first processor is configured to determine if a biometric input from a user attempting to access the electronic locking device matches one of the biometric templates and activate the electronically controllable locking mechanism in response to a determination that the biometric input matches one of the biometric templates. The user device is configured to receive permission from a server to enroll a new user. At least one of the electronic locking device or the user device include a biometric interface configured to receive a new biometric input from the new user. After the user device receives the permission from the server, at least one of (a) the first processor of the electronic locking device is configured to enroll the new user or (b) the instructions when executed by the second processor of the user device cause the second processor to enroll the new user. Enrolling the new user includes using the new biometric input from the new user to generate a new biometric template and storing the new biometric template in the memory.

Another embodiment relates to a lock system including an electronic locking device. The electronic locking device includes a first electronically controllable locking mechanism, a first biometric interface device configured to receive a first biometric input from a user attempting to access the electronic locking device, a first wireless transceiver configured to transfer the first biometric input indirectly through an intermediary device or directly to the server and receive a first confirmation from the server indicating that the first biometric input matches a biometric template corresponding to an authorized user, and a first processor configured to activate the first electronically controllable locking mechanism in response to receiving the first confirmation.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

FIG. 16 is a block diagram of the system of FIG. 1 in the fourth configuration, according to another exemplary embodiment.

Figure 1:
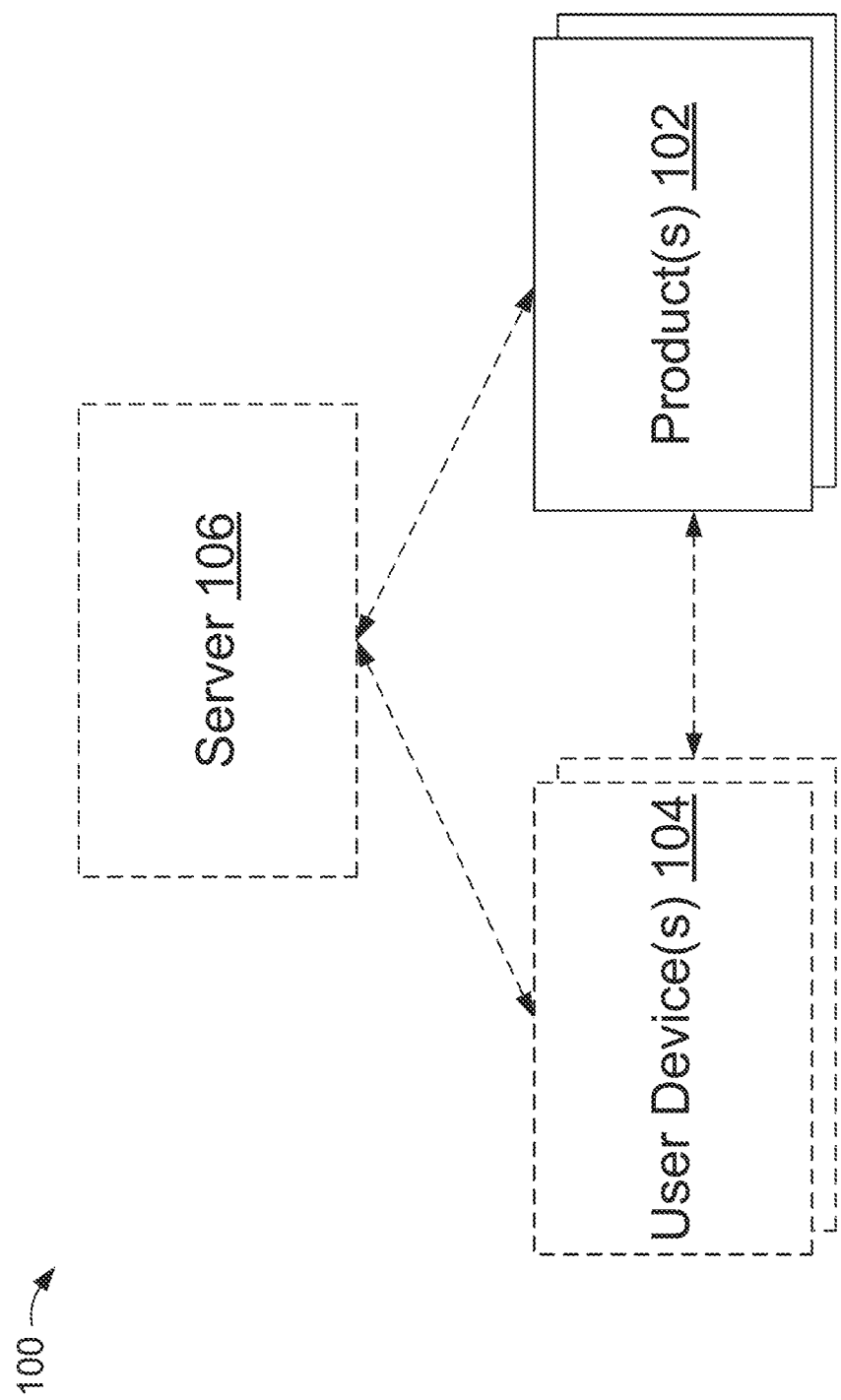
FIG. 1 is a block diagram of a system for accessing a product, according to an exemplary embodiment.

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements. Before turning to the detailed description, which describes the exemplary embodiments in detail, it should be understood that the application is not limited to the details or methodology set forth in the description or illustrated in the figures. It should also be understood that the terminology is for the purpose of description only and should not be regarded as limiting.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Described herein are techniques for managing access to one or more products. According to the disclosure herein, a lock system includes a product, such as an electronic locking device, that can be selectively accessed by a user. The system may further include a user device, such as a mobile phone, and/or a server in direct or indirect communication with the product. The product is configured to receive a biometric input (e.g., a scan of a fingerprint) from a user and compare the biometric input with a biometric template to determine if the user is authorized to access the product. If the biometric input matches the biometric template, then the user is authorized and the product permits the user to access the product (e.g., opens a lock mechanism). If the biometric input does not match the biometric template, then the user is not authorized and the product denies access.

The disclosure herein describes multiple different system configurations and processes for transferring biometric templates throughout the system. In a first configuration, the server generates a user profile, a user key, a handshake nonce, and/or a biometric template corresponding to an authorized user. The server (i) encrypts the user profile, the biometric template, and/or a user key using a product key and/or the handshake nonce and (ii) transfers the encrypted package to a user device along with an unencrypted user key and/or an unencrypted handshake nonce. The user device (i) stores the unencrypted user key and (ii) transfers the encrypted package and/or the unencrypted handshake nonce to a product. Using a product key previously stored on the product and/or the unencrypted handshake nonce received with the encrypted package, the product decrypts the package and extracts the user profile, the user key, and/or the biometric template. In some embodiments, at this point, a user can provide a biometric input directly to the product, and the product will compare the biometric input to the biometric template. In some embodiments, the server does not transmit a biometric template within the encrypted package (e.g., the server does not transmit the biometric template at all, the biometric template is appended to the encrypted package, etc.). In such an embodiment, after the user device transfers the encrypted package to the product, (i) the product may transfer a reply nonce to the user device and/or (ii) the user device may send a command to the product to generate and/or store the biometric template. The command may be encrypted using the user key and/or a modified reply nonce generated by the user device based on the reply nonce received from the product. The product may receive and decrypt the encrypted command using the user key retrieved from the decrypted package and/or a modified reply nonce independently generated by the product using the reply nonce previously transmitted to the user device. In some embodiments, the command instructs the product to locally generate and store a biometric template. In other embodiments, the biometric template is (i) generated at the user device or the server and (ii) transmitted with the encrypted command. In such an embodiment, the command, following decryption by the product, may instruct the product to store the biometric template retrieved from the decrypted command. Alternatively, the user can use the user device to issue a command (e.g., an unlock command, a lock command, a firmware update, a settings update, etc.) to the product. The user device may encrypt such a command using the user key stored on the user device, and the product decrypts the command using the user key retrieved from the decrypted package.

In a second configuration, a user device requests permission from the server to enroll a new user (e.g., generate a biometric template corresponding to the new user). The server grants permission to the user device, and the user device grants permission to the product to enroll the user. The user enrolls at the product, and a confirmation of enrollment is transferred from the product to the user device and from the user device to the server. Alternatively, the new user may enroll at the user device, and the user device may transfer the resultant biometric template to the product.

In a third configuration, the product is configured to accept an enrollment code. When the enrollment code is received, the product enters an enrollment mode. Users can freely enroll on the product when the product is in the enrollment mode.

In a fourth configuration, the product is in direct communication with the server. In one embodiment, the server stores the biometric templates and transfers them to the product. The product then compares a biometric input from a user with the biometric template locally. In another embodiment, the user transfers the biometric input from the user to the server, and the server compares the biometric input to a biometric template stored on the server. The server then sends a confirmation to the product that the user is authorized.

System Elements

Referring to FIG. 1, a block diagram of a lock system or system for accessing a product, shown as system 100, is shown according to an exemplary embodiment. The system 100 includes a product, locking device (e.g., an electronic locking device, etc.), or lock, shown as product 102. The system 100 may additionally include one or more user devices 104 or servers 106 in direct or indirect communication with the product 102. A user may interact with the product 102 directly (e.g., through a biometric interface, through a key pad, etc.) or indirectly (e.g., through the user device 104, etc.) to issue commands and provide information to the product 102. The user device 104 and the server 106 may provide information to the product 102, retrieve information from the product 102, or otherwise interact with the product 102. In other embodiments, one or both of the user device 104 and the server 106 are omitted, and the product 102 functions without communicating with other devices. In some embodiments, the product 102 includes a locking mechanism and a biometric interface, and the product 102 is configured to open the locking mechanism in response to receiving a biometric input from an enrolled user at the biometric interface.

Figure 2:
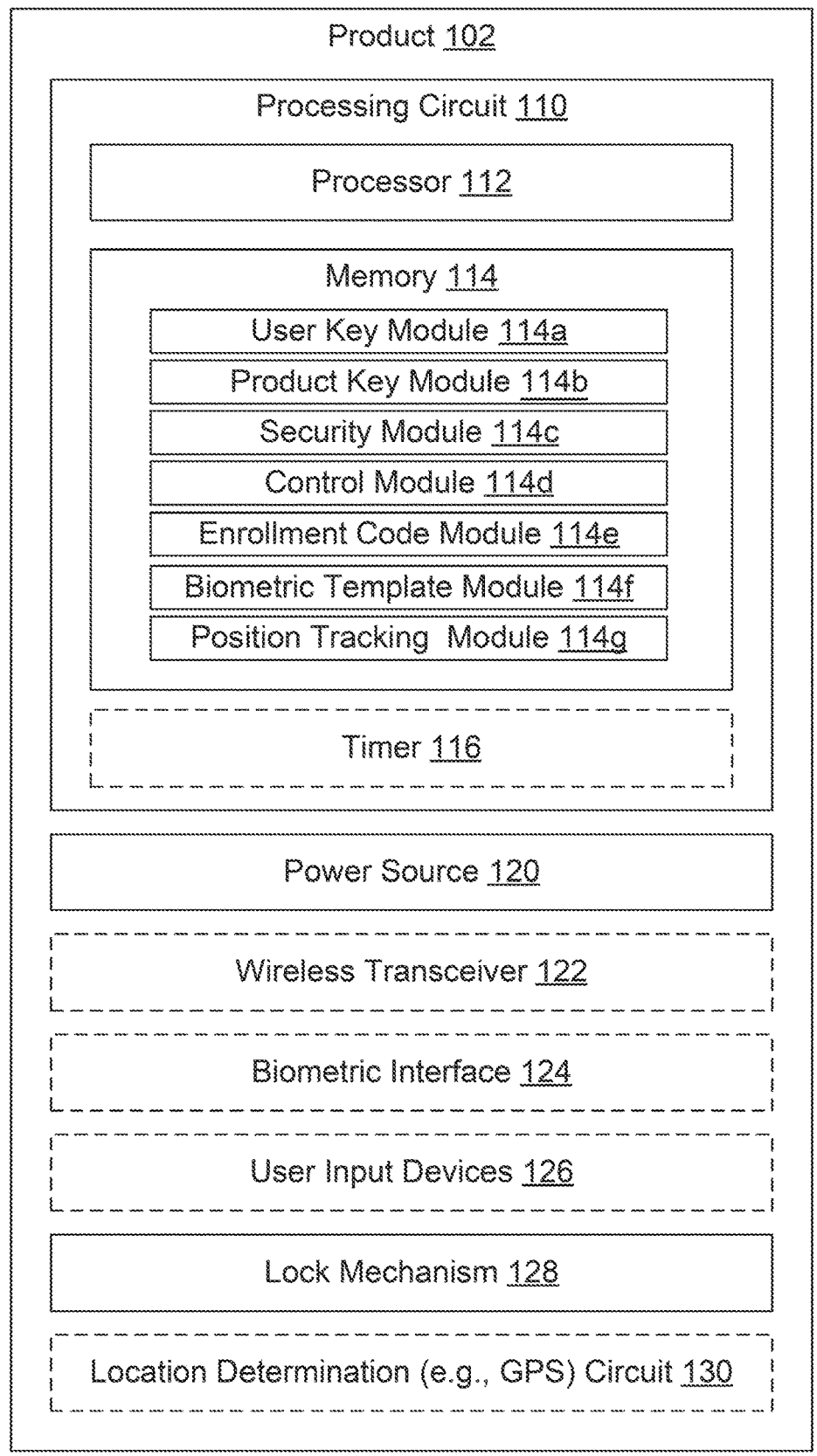
FIG. 2 is a block diagram of a product for implementing the techniques disclosed herein, according to an exemplary embodiment.

Referring to FIG. 2, a block diagram of the product 102 is shown according to one embodiment. For example, the product 102 may be a lock as discussed herein. In general, the product 102 includes a processing circuit 110, which may include a processor 112, a memory 114, and a timer 116 (which may include the clock components of the processor 112, for maintaining a product time). In other embodiments, the timer 116 is omitted. The processor 112 may be any commercially available processor or any of the processors discussed herein (e.g., the processor 142, the processor 172, etc.). The memory 114 includes any of the memory and/or storage components discussed herein. For example, the memory 114 may include RAM and/or cache of the processor 112. The memory 114 may also include one or more storage devices (e.g., hard drives, flash drives, computer readable media, etc.).

The memory 114 includes various software modules configured to implement the techniques disclosed herein with respect to products (e.g., electronic locking devices, etc.). For example, the memory 114 may include a user key module 114a, a product key module 114b, a security module 114c, a control module 114d, an enrollment code module 114e, and a biometric template module 114f. The user key module 114a and the product key module 114b are configured to store the product's corresponding user key and security key, respectively. Other modules of the memory 114 may interact with the user key module 114a and the product key module 114b. For example, the security module 114c, which includes the security algorithms for the product (e.g., encryption/decryption algorithms, MAC generation/verification algorithms, etc.), may retrieve a user key from the user key module 114a. As another example, the security module 114c may access the product key module 114b to retrieve a security key to decrypt an encrypted package received from a user device 104.

The control module 114d contains the software configured to interact with the other modules of the memory 114 to implement the techniques disclosed herein with respect to a product 102. For example, in an embodiment where the product 102 is a lock, after being awoken, the control module 114d may attempt to pair/communicate with a user device 104 (e.g., using the wireless transceiver 122). The control module 114d may also include operating system (e.g., an embedded operating system, firmware, etc.) software for the product 102. As another example, the control module 114d may request the security module 114c to access a user profile and request to determine an action to be taken. Based on the permissions of the user profile and the request, the control module 114d may determine whether or not to take a request action. For example, the control module 114d may generate the signals necessary to control mechanical and/or electronic components of the product 102 (e.g., the lock mechanism 128) in response to a request (e.g., an unlock request for a lock, etc.). As another example, the control module 114d may interface with the lock mechanism 128 to control a user's physical interactions with a lock (e.g., the control module 114d may receive input from a dial interface, a key code interface, buttons, touch interface, etc.) in order to unlock a shackle of the lock. The enrollment code module 114e contains one or more codes (e.g., enrollment codes, master codes, de-authorization codes, etc.) configured to facilitate adding or removing users from the system 100. The biometric template module 114f contains one or more biometric templates of one or more users. The biometric template may contain or include biometric data regarding the one or more users. The biometric data may include fingerprint scans or images, retinal scans or images, facial scans or images, voice recordings, and/or still other biometric data.

The product 102 further includes a source of electrical energy, shown as power source 120. The power source 120 may include one or more batteries, capacitors, external power sources (e.g., connections to a power grid, etc.), or other sources of electrical energy. The power source 120 is configured to provide electrical energy to power the various high current loads (e.g., the lock mechanism 128, etc.) and low current loads (e.g., the processing circuit 110, etc.) of the product 102. In one embodiment, the power source 120 includes a battery for powering the high current load(s) and a capacitor in parallel with the low current load(s). A circuit of the product 102 may be configured to cause the low current loads to be powered by the capacitor (and in some embodiments not the battery) while the battery is driving the high current load(s).

The product 102 further includes a communications device or interface, shown as wireless transceiver 122, which includes various communication hardware. The wireless transceiver 122 includes communications hardware (e.g., Bluetooth components, Bluetooth Low Energy components, radiofrequency components, near field communication (NFC) components, ZigBee components, radio frequency identification (RFID) components, Wi-Fi components, Cat-1M components, etc.) for wireless communication with another device (e.g., other products 102, the user devices 104, the server 106, etc.). The wireless transceiver 122 may be configured to communicate using various communication protocols (e.g., Wi-Fi, Cat-1M, radiofrequency, RFID, Wi-Fi, Bluetooth, Bluetooth Low Energy, ZigBee, NFC, etc.). In some embodiments, the wireless transceiver 122 is configured to communicate using two or more communication protocols. For example, the wireless transceiver 122 may include both a Bluetooth transceiver and a cellular transceiver configured to establish a Bluetooth-based connection and a cellular connection respectively with the server 106 and/or with other products 102 (e.g., through the wireless transceiver 152).

The products 102 discussed herein may be configured to be locked or unlocked using a user interface device other than a combination input or keypad input on the product 102 (e.g., the user input devices 156 of the user device 104, the network interface 180 of the server 106, etc.) through a connection provided by the wireless transceiver 122. For example, wireless communications may be used to lock/unlock/control the product 102 wirelessly (e.g., an application on a user device 104 may be used to lock or unlock the product 102). In one embodiment, the circuit of the product 102 also includes an input/output port (e.g., a USB port, a COM port, a networking port, etc.) that may be used to establish a physical connection to another device. For example, such a physical connection may be used by a manufacturer to program or otherwise communicate with product 102, or to connect the product 102 with the server 106. In yet other embodiments, the wireless transceiver 122 is omitted, and the product 102 operates without communicating with other devices.

The product 102 further includes an interface device, shown as biometric interface 124. The biometric interface 124 is configured to receive a biometric characteristic or biometric input from a user that serves as an identifier that is unique to the user. Accordingly, the product 102 may be configured to use the biometric input to identify the user. The biometric interface 124 may include various types of hardware configured to receive various types of biometric inputs. By way of example, the biometric interface 124 can include fingerprint scanners, cameras, microphones, or other interfaces, and the biometric inputs can include images of fingerprints, faces, or retinas, vocal recordings, or other inputs. In other embodiments, the biometric interface 124 is omitted.

The product 102 may also include other interface devices, shown as user input devices 126, that facilitate interaction of a user with the product 102 (e.g., to manage the product 102). The user input devices 126 may be physical or digital devices. For example, the user input devices 126 may include one or more dials, combination lock interfaces, keyholes, buttons, keypads, touch screens, touch sensitive areas, displays, speakers, keyboards, stylus inputs, mice, track pads, etc. The user input devices 126 may additionally be configured to provide information to the user (e.g., through selectively illuminating one or more lights, through a graphical user interface, etc.). In one embodiment, the user input devices 126 include touch detection devices and/or proximity detection devices configured to detect the presence of a user (e.g., based on a user's touch, based on motion of a user, etc.).

In an embodiment where the product 102 is a lock, the product 102 includes one or more lock mechanisms 128 configured to selectively prevent access (e.g., to an area, to an item, etc.). The lock mechanism 128 includes one or more physical and/or electronic locking mechanisms (e.g., pins, shackles, dials, buttons, shafts, keyholes, etc.) as discussed herein. In some embodiments, the lock mechanism 128 is an electronic locking mechanism that is powered by the power source 120 (e.g., is a high current load on the power source 120). In one embodiment, the product 102 is an electronic padlock, such as an electronic combination or keypad padlock. In other embodiments, the product 102 may be or include, without limitation, devices such as an electronic door lock or keypad device (e.g., a keypad deadbolt), an electronic safe (e.g., a small document safe, an electronic key safe, etc.), an electronic rim or mortise lock or other type of cabinet lock, an electronic auto accessory lock (e.g., a coupler lock, a hitch pin lock, a trailer lock, etc.) and/or a steering wheel or door lock for an automobile, a vehicle lock (e.g., a wheel lock or ignition lock) for other motorized or non-motorized vehicles such as a bicycle, a motorcycle, a scooter, an ATV, and/or a snowmobile, a storage chest, a case with an electronic lock (e.g., a document case or a case for small valuables), an electronic cable lock (e.g., a cable lock enabled with an alarm, such as for securing a computing device), a safety lockout/tagout device for securing access for safety purposes (e.g., for securing an electrical control box while electrical work is being performed), a locker with an electronic lock, and/or an electronic luggage lock.

In one embodiment, the product 102 is configured to provide access to secured data (e.g., stored in a memory, etc.) or to store secured data. For example, rather than containing physical locking components (or in addition to physical locking components), the lock mechanism 128 may include a secured memory (e.g., the memory 114 may include an encrypted hard drive, etc.). Such a product 102 may communicate (e.g., using the wireless transceiver 122) based on the authentication techniques discussed herein. For example, upon authentication, the product 102 may use its stored product key to decrypt secured content that is stored in memory 114. Decrypted content may then be provided to another device (e.g., using the wireless transceiver 122).

In some embodiments, the product 102 may include a location determination circuit 130, such as a Global Positioning System (GPS) device/receiver, that may determine one or more locations of the product 102 at one or more times. In various implementations, the location determination circuit 130 may be part of or separate from the wireless transceiver 122. In some such embodiments, the memory 114 may include a position tracking module 114g configured to receive the location data from location determination circuit 130 and store data indicative of the location or position of the product 102 at one or more times.

Figure 3:
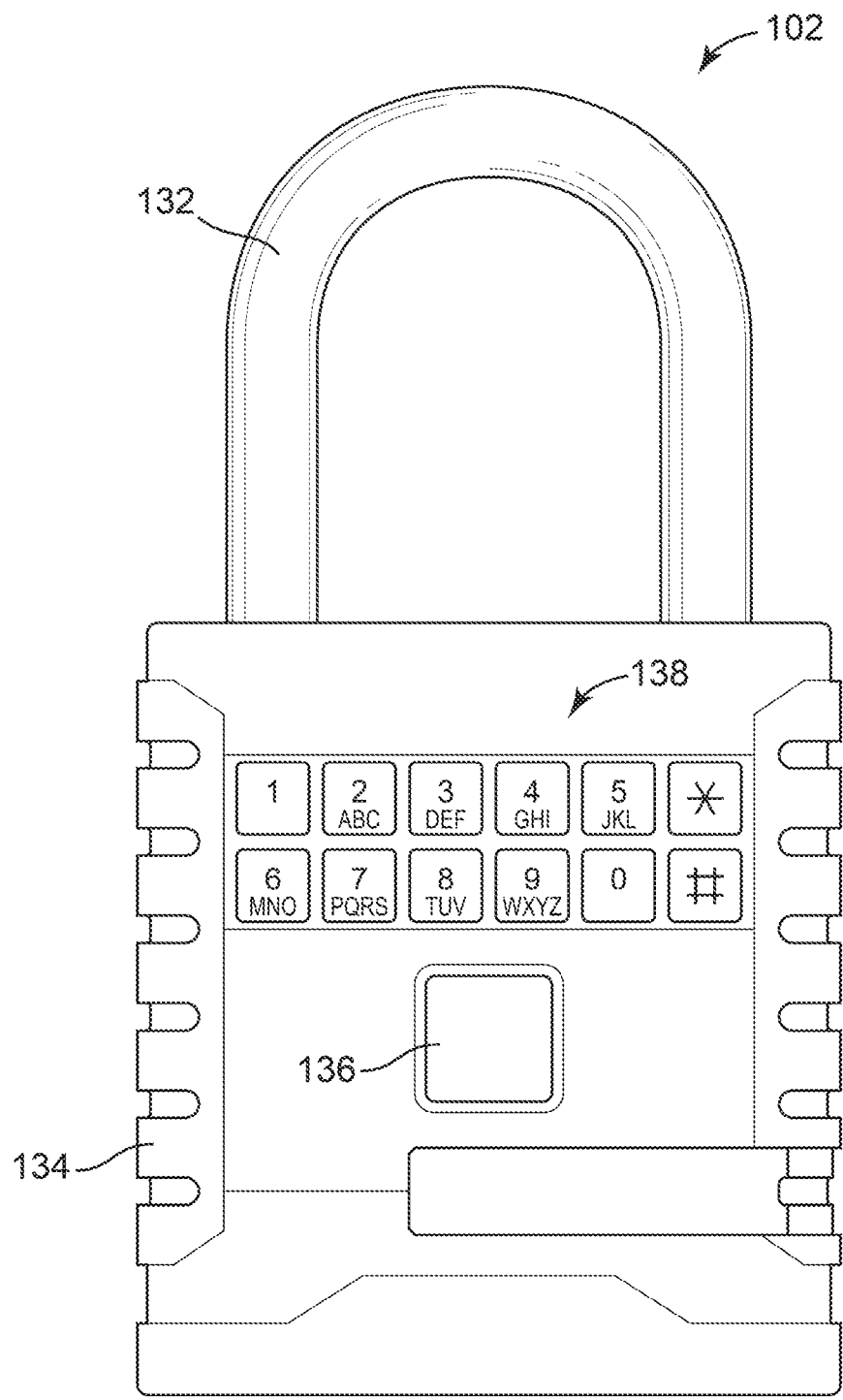
FIG. 3 is a diagram of the product of FIG. 2 configured as a locking device, according to an embodiment.

Referring to FIG. 3, the product 102 is shown, according to an exemplary embodiment. In this embodiment, the lock mechanism 128 includes a shackle 132 coupled to a housing, shown as case 134. The shackle 132 is configured to be selectively fixed by the lock mechanism 128 relative to the case 134 to selectively prevent removal of items extending around or through the shackle 132 (e.g., a chain). Various processing and mechanical components may be embedded within the case 134. For example, the processing and mechanical components may include one or more of the components (e.g., the processing circuit 110, the power source 120, the wireless transceiver 122, the biometric interface 124, the user input device 126, the lock mechanism 128, the location determination circuit 130, etc.) discussed with reference to the product 102 of FIG. 2. The biometric interface 124 includes a biometric interface device, shown as fingerprint scanner 136, and the user input devices 126 include a user input device, shown as keypad 138. The fingerprint scanner 136 and the keypad 138 are coupled to the case 134 and accessible from the exterior of the case 134. The fingerprint scanner 136 is configured to receive a biometric input in the form of an image of a user's fingerprint. The keypad 138 includes a series of buttons, each corresponding to a number, letter, and/or command. The keypad 138 is configured to receive a user input in the form of the user depressing the buttons in a desired pattern (e.g., corresponding to a number, phrase, or command, etc.) In one embodiment, the user input device 126 includes a touch sensor configured to awaken the product 102 in response to a user's touch. In one embodiment, the user input device 126 includes a proximity sensor configured to awaken the product 102 in response to detecting a nearby user. In one embodiment, the user input device 126 includes a mechanical dial configured to allow a user to enter a code to the product 102 (e.g., to unlock the shackle 132, etc.).

Figure 4:
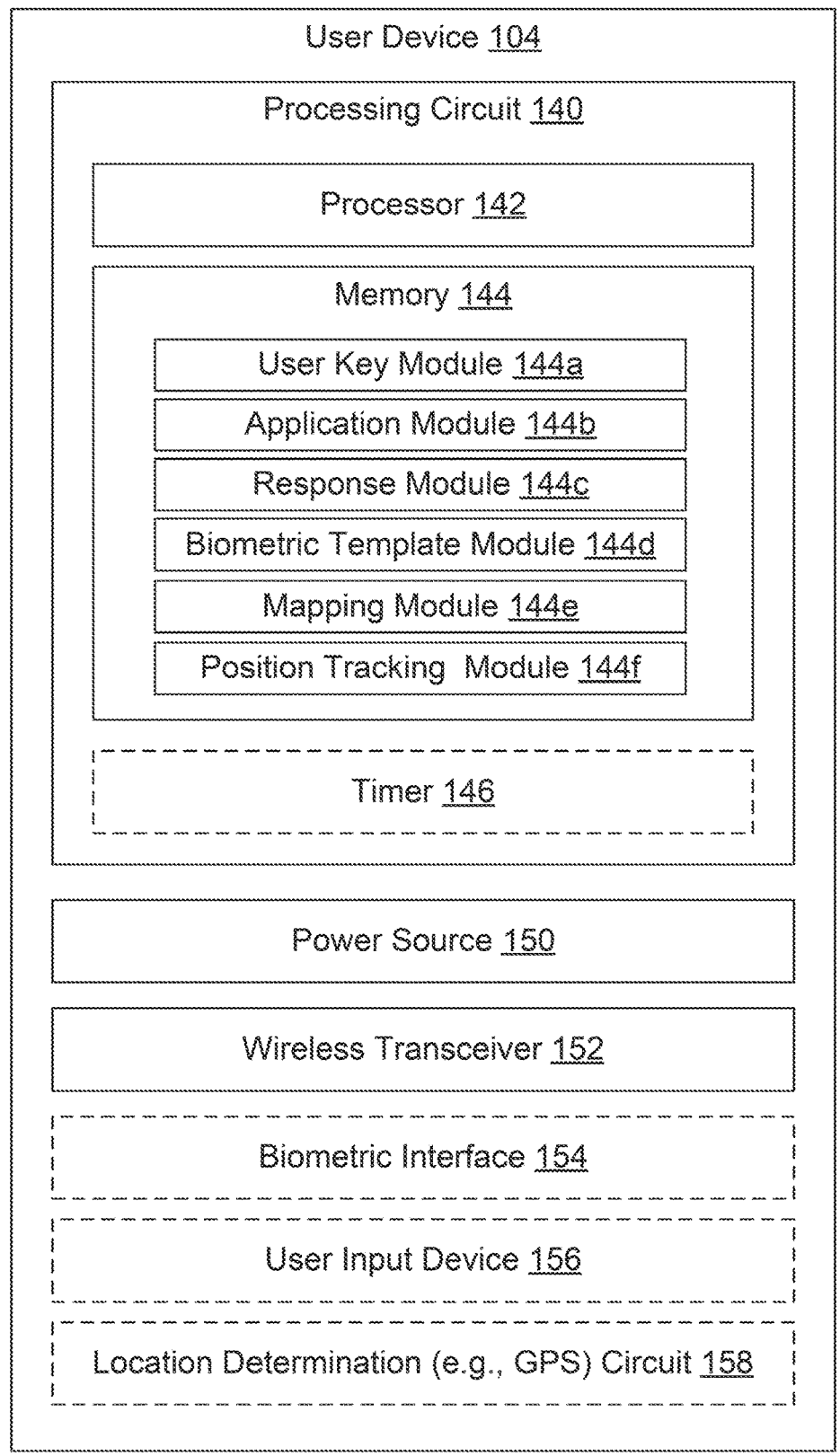
FIG. 4 is a block diagram of a user device for implementing the techniques disclosed herein, according to an exemplary embodiment.

Referring to FIG. 4, a block diagram of the user device 104 is shown according to an exemplary embodiment. In general, the user device 104 is configured to at least partially manage the operation of the product 102. For example, a mobile phone may be used to unlock, lock, and otherwise manage the function of an electronic locking device. The user device 104 may correspond to a mobile device. In one embodiment, the user device 104 is a mobile phone. In another embodiment, the user device 104 is a laptop computer. In another embodiment, the user device 104 is a tablet computer. In another embodiment, the user device 104 is a desktop computer. In general, the user device 104 includes a processing circuit 140, which may include a processor 142, a memory 144, and a timer 146. The processor 142 may be any commercially available processor or any of the processors discussed herein (e.g., the processor 112, the processor 172, etc.). The timer 146 may include the clock components of the processor 142 for maintaining a device time. In other embodiments, the timer 146 is omitted. The memory 144 includes any of the memory and/or storage components discussed herein. For example, the memory 144 may include RAM and/or cache of the processor 142. The memory 144 may also include one or more storage devices (e.g., hard drives, flash drives, computer readable media, etc.) either local or remote to the user device 104. The timer 146 is configured to maintain a time value for user device 104. For example, the timer 146 may be the clock of processor 142, or may be any other time keeping circuit of the user device 104.

The memory 144 includes various software modules configured to implement the techniques disclosed herein with respect to user devices. For example, the memory 144 includes a user key module 144a, which is configured to store and provide the user key as requested by the other modules of the memory 144. An application module 144b is configured to provide the an application of the user device 104 used to manage various aspects of the system 100. For example, in an embodiment where the user device 104 is a mobile phone, the application module 144b includes the software corresponding to a mobile phone app, which may be used to interface with a server 106 and/or a product 102. The application module 144b may be configured to manage the profile generation process, including interactions with the server 106 and the product 102. For example, a user may interact with the user device 104 (e.g., using the user input device 156) through the application provided by application module 144b. The user may create one or more profiles corresponding to one or more products, which are transmitted (e.g., using the wireless transceiver 152) to the server 106. The server 106 may encrypt a user profile, and provide the encrypted user profile, user key, MAC, etc., to the user device 104 as discussed herein. The application module 144b may also interact with a product 102 using the wireless transceiver 152. A response module 144c may include the security algorithms required for communication with a product (e.g., sending encrypted commands). Additionally, the response module 144c may include encryption/decryption and MAC authentication algorithms, which may be accessed by application module 144b during secured communications. The user device 104 may include a biometric template module 144d that contains one or more biometric templates of one or more users. In some implementations, the memory 144 may include a mapping module 144e that may be used to generate one or more mapping interfaces based on location data received from a product 102 or the user device 104.

The user device 104 further includes a source of electrical energy, shown as power source 150. The power source 150 may include one or more batteries, capacitors, external power sources (e.g., connections to a power grid, etc.), or other sources of electrical energy. The power source 150 is configured to provide electrical energy to power the various high current loads and/or low current loads (e.g., the processing circuit 140, etc.) of the user device 104.

The user device 104 further includes a communications device or interface, shown as wireless transceiver 152, which includes various communication circuitry for different protocols of communication. The wireless transceiver 152 includes communications hardware (e.g., Bluetooth components, Bluetooth Low Energy components, radiofrequency components, near field communication (NFC) components, ZigBee components, radio frequency identification (RFID) components, Wi-Fi components, Cat-1M components, etc.) for wireless communication with another device (e.g., the products 102, other user devices 104, the server 106, etc.). The wireless transceiver 152 may be configured to communicate using various communication protocols (e.g., Wi-Fi, Cat-1M, radiofrequency, RFID, Wi-Fi, Bluetooth, Bluetooth Low Energy, ZigBee, NFC, etc.). In some embodiments, the wireless transceiver 152 is configured to communicate using two or more communication protocols. For example, the wireless transceiver 152 may include both a Bluetooth transceiver and a cellular transceiver configured to establish a Bluetooth-based connection and a cellular connection with the server 106 and/or with products 102.

The user device 104 further includes an interface device, shown as biometric interface 154. The biometric interface 154 is configured to receive a biometric characteristic or biometric input that serves as an identifier that is unique to the user providing the biometric input. Accordingly, the user device 104 may be configured to use the biometric input to identify the user. The biometric interface 154 may include various types of hardware configured to receive various types of biometric inputs. By way of example, the biometric interface 154 can include fingerprint scanners, cameras, microphones, or other interfaces, and the biometric inputs can include images of fingerprints, faces, or retinas, vocal recordings, or other inputs. In other embodiments, the biometric interface 154 is omitted.

The user device 104 may also include other interface devices, shown as user input devices 156, that facilitate interaction of a user with the user device 104 (e.g., to manage the user device 104). The user input devices 156 may be physical or digital devices. For example, the user input devices 156 may include one or more dials, combination lock interfaces, keyholes, buttons, keypads, touch screens, touch sensitive areas, displays, speakers, keyboards, stylus inputs, mice, track pads, etc. The user input devices 126 may additionally be configured to provide information to the user (e.g., through selectively illuminating one or more lights, through a graphical user interface, etc.).

In some embodiments, the user device 104 may include a location determination circuit 158, such as a Global Positioning System (GPS) device/receiver, that may determine one or more locations of the user device 104 at one or more times. When the user device 104 is in communication with the product 102, the location determination circuit 158 may additionally determine the location of the product 102 using the location of the user device 104. By way of example, certain communication protocols have a maximum range within which they can communicate. The location determination circuit 158 may determine that the product 102 is within that maximum range of the user device 104 when the user device 104 is in communication with the product 102 using a particular protocol. In various implementations, the location determination circuit 158 may be part of or separate from the wireless transceiver 152. In some such embodiments, the memory 144 may include a position tracking module 144f configured to receive the location data from location determination circuit 158 and store data indicative of the location or position of the user device 104 and/or the product 102 at one or more times.

Figure 5:
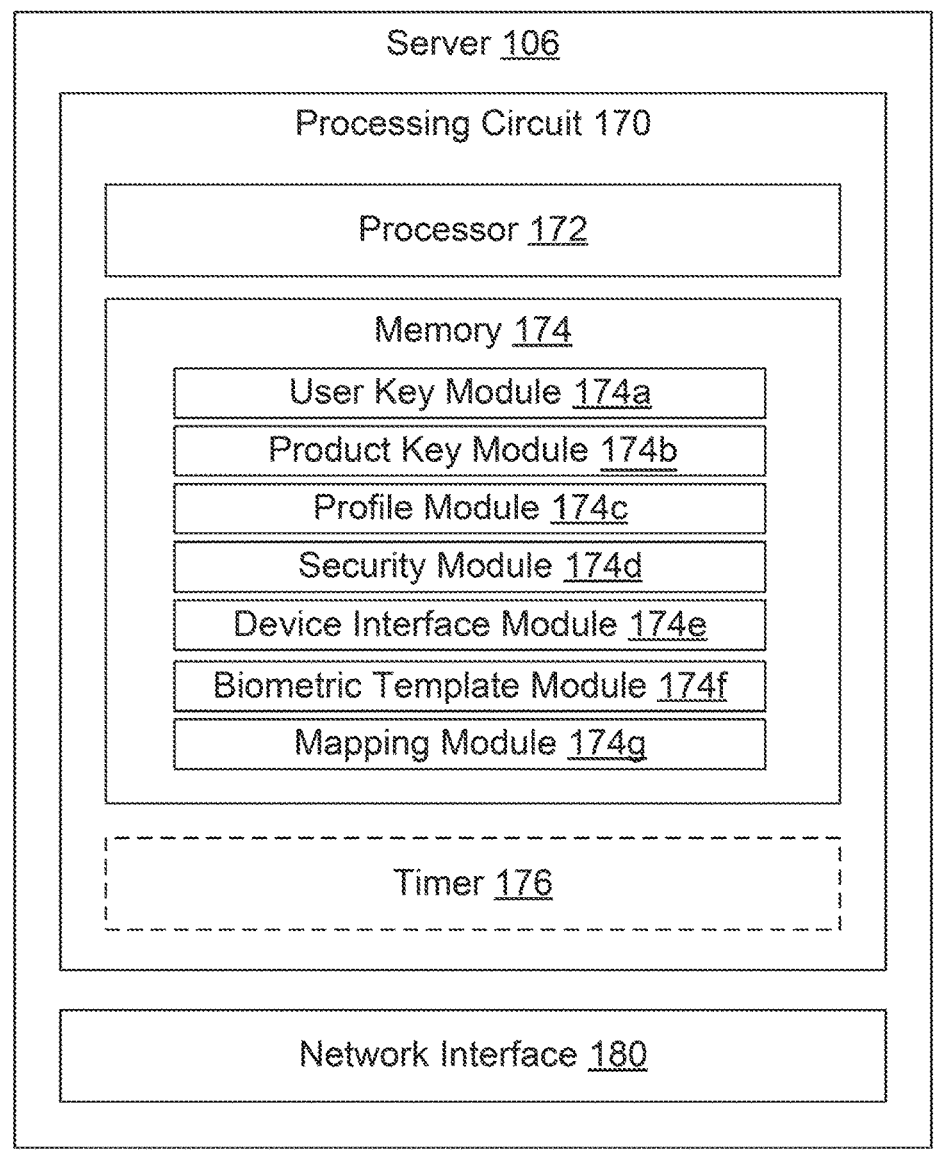
FIG. 5 is a block diagram of a server for implementing the techniques disclosed herein, according to an exemplary embodiment.

Referring to FIG. 5, a block diagram of a server 106 for implementing the techniques disclosed herein is shown, according to one embodiment. The server 106 may be one server (a physical or virtual server), or may include multiple servers. The server 106 includes one or more physical or virtual servers/server slices, etc. In general, the server 106 is configured to interact with a user device (e.g., the user device 104, etc.) or a product (e.g., the product 102). The server 106 may include a processing circuit 170. The processing circuit 170 includes a processor 172, a memory 174, and a timer 176. As an example, the processor 172 may include any commercial available processor, e.g., a server processing chip, a virtual processor, etc. The memory 174 includes any of the memory and/or storage components discussed herein. For example, the memory 174 may include RAM and/or cache of a processor 172. The memory 174 may also include any mass storage devices (e.g., hard drives, flash drives, computer readable media, etc.). The timer 176 may include the clock components of the processor 172 for maintaining a device time. In other embodiments, the timer 176 is omitted.

The memory 174 may include a user key module 174a and product key module 174b. The user key module 174a and the product key module 174b may be configured to securely store user keys and product keys, respectively. The user and product keys may correspond to specific products 102. As an example, the user key module 174a and the product key module 174b may correspond to databases of keys, and may include the software configured to store and retrieve such keys. A profile module 174c includes the software configured to interact with a product 102 (e.g., to manage the process of user profile generation, storage, and communication with a user device 104). The profile module 174c may also interact with a security module 174d, which may include security algorithms. For example, the security module 174d may be configured to generate a user key, a product key, encrypt/decrypt data, generate a MAC based on data, generate a nonce, etc., and provide such data to the profile module 174c. In one embodiment, the security functions of the security module 174d, the user key module 174a, and the product key module 174b are located on the server 106 separate from the profile module 174c (e.g., on separate servers). In this embodiment, various services may be provided by appropriate servers 106 such that the profile module 174c may access security functions and retrieve keys as necessary. In some embodiments, the server 106 is also configured to interact with a product 102. For example, during a manufacturing process, the server 106 may provide a user key and/or a product key to be stored in a corresponding product 102. The server 106 may include a biometric template module 174f that contains one or more biometric templates of one or more users. In some implementations, the memory 174 may include a mapping module 174g that may be used to generate one or more mapping interfaces based on location data received from a product 102 or a user device 104.

The server 106 includes a communications device or interface, shown as network interface 180, configured to facilitate communication between the server 106 and the user device 104 and/or the product 102. Communications between the server 106 and the user device 104 and/or the product 102 may be direct or through an intermediate network (e.g., an internet network, a cellular network, etc.). For example, the network interface 180 may include physical network components (e.g., a network card, etc.) configured to allow the server 106 to establish a connection to the wireless transceiver 122 of the product 102 or the wireless transceiver 152 of the user device 104. In one embodiment, communications from the network interface 180 are routed through a cellular interface, allowing the server 106 to communicate with the user device 104 through a cellular network. In one embodiment, the network interface 180 allows the server 106 to establish an Internet-based connection with the user device 104.

The processors described herein (e.g., the processor 112, the processor 142, the processor 172) may represent one or more processors and may be implemented as a general-purpose processor, an application specific integrated circuit (ASIC), one or more field programmable gate arrays (FPGAs), a digital-signal-processor (DSP), a group of processing components, or other suitable electronic processing components. The memories described herein (e.g., the memory 114, the memory 144, the memory 174) may include random access memory (RAM) devices comprising a main storage of the respective device, as well as any supplemental levels of memory, e.g., cache memories, non-volatile or back-up memories (e.g., programmable or flash memories), read-only memories, etc. In addition, the memories may include memory storage physically located elsewhere, e.g., any cache memory in the corresponding processors as well as any storage capacity used as a virtual memory, e.g., as stored on a mass storage device, etc.

In general, the routines executed to implement the embodiments may be implemented as part of an operating system or a specific application, module, or sequence of instructions. In certain embodiments, the devices described herein (e.g., the product 102, the user device 104, the server 106) include one or more modules structured to functionally execute the respective operations necessary for the processes described herein. The description herein including modules emphasizes the structural independence of the aspects of a device and illustrates one grouping of operations and responsibilities of a device. Other groupings that execute similar overall operations are understood to be within the scope of the present application. The modules typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems. Those skilled in the art will appreciate that the various embodiments are capable of being distributed as a program product in a variety of forms, and that this applies equally regardless of the particular type of computer-readable media used to actually effect the distribution.

Any of the devices discussed herein (e.g., the product 102, the user device 104, the server 106) may also be configured to generate an audit trail related to their operations. By way of another example, a log may be formed to detail the events that occur throughout the interaction of a user device 104 and a product 102. This may include server-to-user device events (e.g., sending an encrypted package, etc.), user device-to-product events (e.g., sending/responding to an unlock request, logging when authentication succeeds and fails, etc.), device-only events (e.g., logging when a user enters biometric inputs into the product 102, logging application errors, logging shackle status of an electronic locking device, etc.), product-to-server events (e.g., transferring biometric templates or biometric inputs, etc.), among others. The scope of the present disclosure is not limited to a particular log formatting.

The location information from the location determination circuit 130 and/or the location determination circuit 158 may provide a last known location of the product 102. The user device 104 can also be equipped with mapping functionality so that the last known location of the product 102 may be displayed on a map, based on the provided location information. Alternatively, the user device 104 may allow the location information to be exported to a third party mapping application. These location features can allow a user to open an application on a user device 104 and then view a map that indicates where the product 102 was located when the last known location (e.g., GPS coordinates) was provided. Additionally, navigational directions or other features may be provided to guide a user to the product 102.

The following discussion describes embodiments where a biometric profile or biometric template corresponding to an authorized user is transferred to a product 102. Once the biometric template is transferred to the product 102, the product 102 and/or a user device 104 operatively coupled (e.g., wirelessly connected) to the product 102 may be configured to receive a biometric input from a user. A device within the system 100 (e.g., the product 102, the user device 104, the server 106, etc.) then compares the biometric input with the biometric template, generating a similarity score where a greater similarity score indicates a greater similarity between the biometric input and the biometric template. If the similarity score is greater than a similarity score threshold, the biometric input is determined to be that of an authorized user, and the product 102 permits the user to access the product 102 (e.g., unlocks or opens the lock mechanism 128).

Any of the processes or system configurations described herein may be used in combination with one another. By way of example, the process 400 may be used to add a biometric template to a product 102, and the process 200 may subsequently be used to add other biometric templates to the product 102. Additionally, the system 100 can be reconfigured between any of the configurations described herein. By way of example, the system 100 may be reconfigured from the configuration of FIG. 12 to the configuration of FIG. 14 or FIG. 10 simply by connecting the product 102 to a user device 104 and/or a server 106.

Configuration 1

Figure 6:
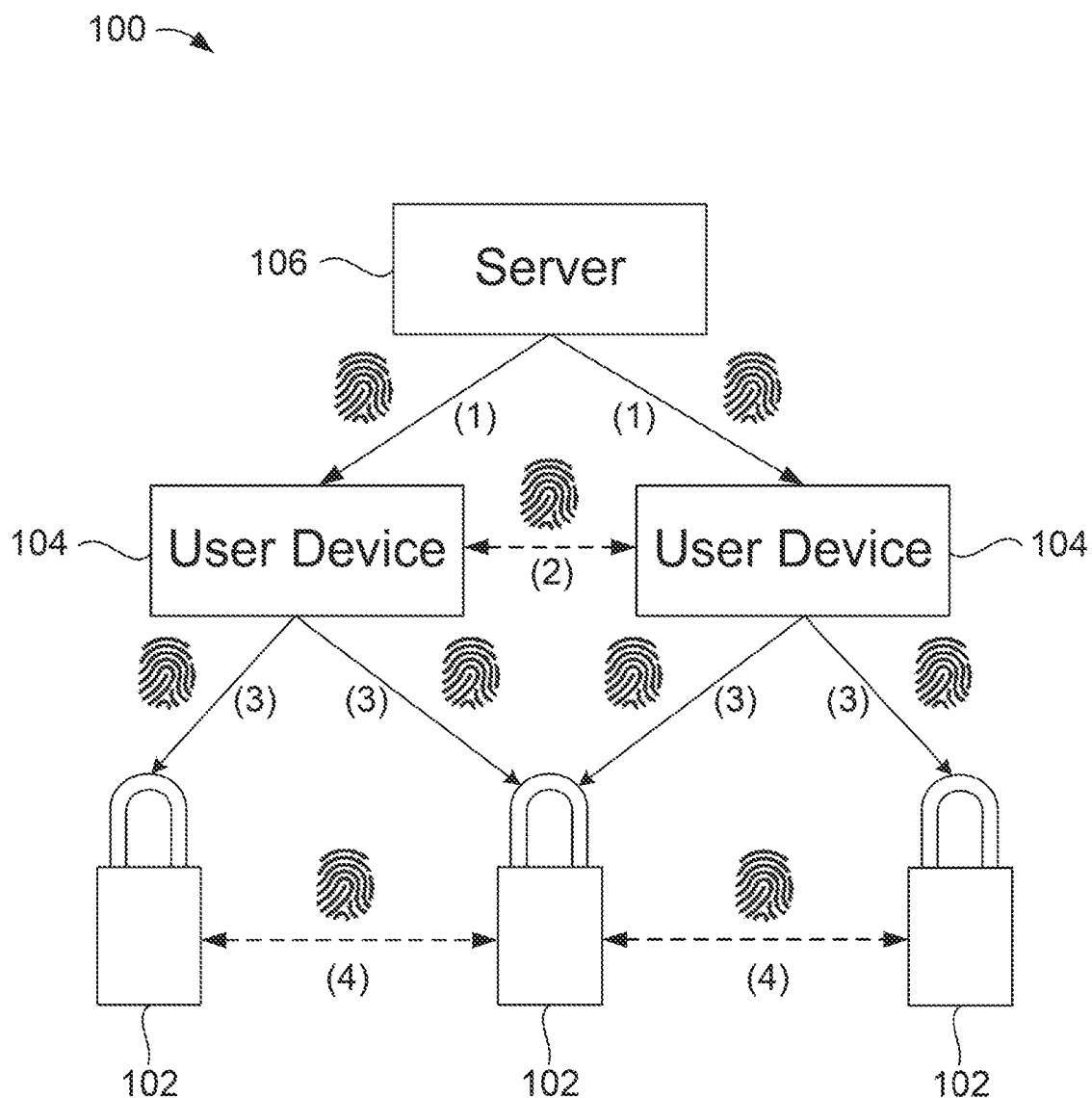
FIG. 6 is a block diagram of the system of FIG. 1 in a first configuration, according to an exemplary embodiment.
Figure 7:
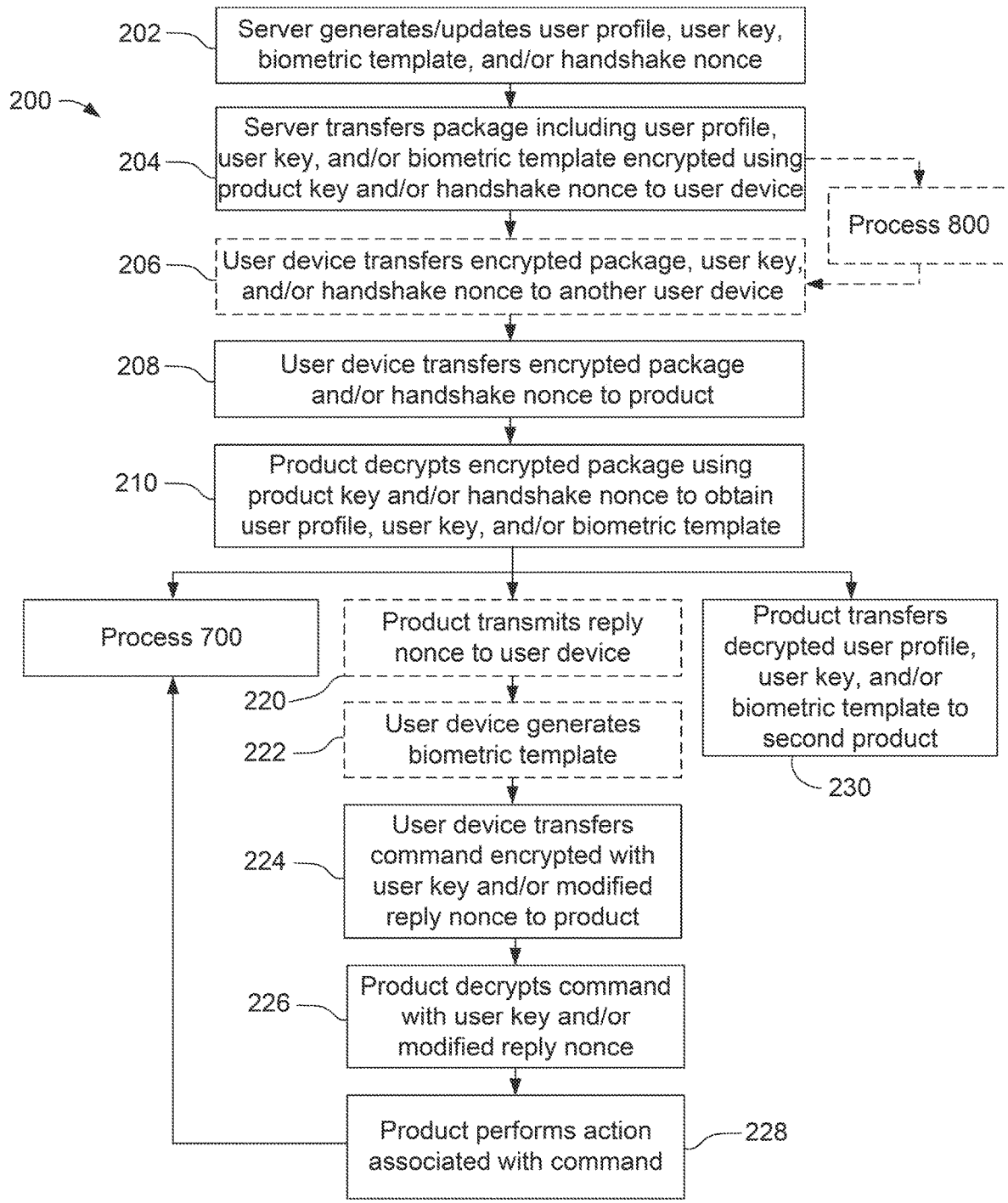
FIG. 7 is a flow diagram of a process for distributing biometric templates throughout the system of FIG. 6, according to an exemplary embodiment.

FIG. 6 illustrates a first configuration of the system 100. Referring to FIG. 7, a flow diagram of an illustrative process 200 for distributing biometric templates throughout the system 100 of FIG. 6 is shown, according to an exemplary embodiment. In alternative embodiments, fewer, additional, and/or different steps may be performed. Also, the use of a flow diagram is not meant to be limiting with respect to the order of steps performed.

In this configuration, the server 106 is in direct communication with one or more user devices 104. The user devices 104 are in direct communication with one or more products 102. In some embodiments, the user devices 104 are in direct communication with one another. In some embodiments, the products 102 are in direct communication with one another.

In this configuration, a user profile, a biometric template, and/or a user key are (i) encrypted by the server 106 using a product key and/or a handshake nonce and (ii) transferred as an encrypted package with the user key and/or the handshake nonce appended thereto to a user device 104. The user device 104 transfers the encrypted package (the user profile, the biometric template, and/or the user key) to the product 102 without the user key appended thereto. The product 102 decrypts the encrypted package using the product key and/or the handshake nonce appended to the encrypted package. Once the product 102 decrypts the encrypted package, the process 200 can continue along one of at least three paths. In the first path, the encrypted package includes the biometric template and the product 102 receives a biometric input from a user, compares the biometric input with the biometric template, and determines whether or not to permit access to the product 102. In the second path, the encrypted package does not include the biometric template and the user device 104 issues an encrypted command to the product 102, the product 102 decrypts the command, and the product 102 performs the action associated with the command (e.g., store the biometric template sent with the command, generate the biometric template locally, etc.). In the third path, the product 102 transfers the decrypted user profile, user key, and/or biometric template to another product 102.

A user profile, a user key, a biometric template, and/or a handshake nonce are generated and/or updated on the server 106 (202). The user profile includes information relating to the operation of the product 102 (e.g., an access schedule, permissions, etc.) and may be configured for a specific user. The biometric template includes the biometric information associated with a user (e.g., images of fingerprints, facial images, retinal images, vocal recordings, etc.). The user key is configured to be provided to both the user device 104 and the product 102. The user device 104 and the product 102 use the user key to engage in encrypted communication with one another. In some embodiments, the handshake nonce is configured to be provided to the product 102 to facilitate the encrypted communication.

If a user profile does not yet exist, default values, or values provided by a user through the user device 104 may be used to generate a new user profile. For example, the user may enter profile data into an application of the user device 104, which transmits the profile data to the server 106. If the user has already created a user profile, the server 106 may instead update the user profile with new values provided by the user through the user device 104.

In general, a user profile may include one or more files that include data related to operation of the product 102. For example, a user profile may contain a schedule of when the product 102 may be accessed (unlocked, locked, etc.). The schedule may specify lock access permissions (e.g., by day of the week) including starting times (hours, minutes, etc.) and ending times (hours, minutes, etc.) for each corresponding permission. For example, a schedule may specify the time periods in which a product 102 may be accessed (e.g., unlocked) by a user device 104. As another example, the schedule may specify time periods in which typical interactions are expected to occur (e.g., active periods), and a level of trust (e.g., a similarity score threshold) may be determined based on these time periods (e.g., as discussed in the process 700). Accordingly, an unlock request sent within an expected time period may be more trusted by the lock than a request sent at an unexpected/atypical time. The user device 104 may also automatically adjust a schedule. For example, the user device 104 may log/record a user's interactions with the product 102, and may set a schedule based around the user's anticipated actions. In one embodiment, a default user schedule is set (e.g., by the manufacturer, etc.). Additionally, a list of typical user schedules may also be provided to allow a user to select from one of many configuration options. In this manner, a manufacturer may provide various recommended operational settings to a user. A user may also customize a schedule to tailor the schedule as he or she desires.

A user profile may further specify a model/serial number of the product 102 and what types of accesses are available for a user corresponding to the user profile. For example, such accesses may include: reading software/hardware version information of the product 102, updating software of the product 102, reading a shackle state of the product 102, locking, unlocking, disarming, reading/setting a time/clock value, reading a battery level, reading/clearing event related data (e.g., flags, counters, etc.), reading a log of the product 102, reading/setting/resetting a keypad code of the product 102, reading communications data for the product 102 (e.g., transmission statuses, transmission power levels, channel information, addressing information, etc.), reading/setting default values stored for the product 102 (e.g., default disarm times, default unlock times, etc.), among others. A user profile may also specify a start time and a revocation date/time for the user profile (i.e., when the user profile begins to be valid and when the user profile expires and is no longer valid). A user profile may provide maximum disarm/unlock times for the product 102. A user profile may also provide an indication of a trust level of a corresponding mobile device (e.g., whether a time value/timestamp provided by the mobile device is trusted or not). The product 102 may be configured to allow or disallow certain functionality based on the trust level of a device. The trust level may be stored as an independent permission that the user may or may not have access to (e.g., the trust level may be managed/adjusted by the software of the product 102, the user device 104, or the server 106, etc.). As an example, only a highly trusted device may be able to upgrade the firmware of the product 102 or change certain settings. Additionally, the product 102 may have a security algorithm that factors in a trust level and time value. For example, as a device successfully interacts with the product 102 more often, the product 102 may increase (or adjust) a trust level for the device. However, if a time value is out of sync with the maintained time of the product 102 authentication fails, the product 102 may decrease (or adjust) a trust level for the device. The time value provided by the user device 104 may be compared to a time value maintained by the product 102, and a degree of closeness between the two times may be used to indicate a trust level for the device (e.g., the closer the two times are to being in sync, the higher the trust level, etc.). If a trust level decreases below a certain threshold, the product 102 may discontinue or limit interactions with the user device 104. A trust level may also be based on the schedule discussed above. For example, a user device 104 may be regarded as more or less trusted based on the time the user device 104 is accessing the product 102, and whether that time falls within certain time periods as defined by the schedule. The time value provided by the user device 104 may also be used to sync the timer 116 of the product 102 with that of the mobile device, or may be used otherwise during authenticated communications. Any of the profile items discussed may have default values (e.g., manufacturer defaults) or user provided values. A profile is not limited to the above data, and additional data may be included. A profile may also be stored on the server 106 for later retrieval.

The biometric template is generated by a product 102, by a user device 104, or by another type of device (e.g., a dedicated enrollment scanner) and, in some embodiments, transferred to the server 106. By way of example, the biometric template may be generated using one or more biometric inputs received at the biometric interface 124 of the product 102. By way of another example, the biometric template may be generated using one or more biometric inputs received at the biometric interface 154 of the user device 104 (e.g., using an application running on the user device 104). By way of another example, the biometric template may be generated using one or more biometric inputs received at an enrollment scanner. The enrollment scanner may be a device that is dedicated to the receipt, use, and management of biometric inputs and the generation of biometric templates. By way of example, the enrollment scanner may be a device that remains in a known location within a building (e.g., a human resources office, a school counselor's office, a time clock station used to record worker hours, etc.). The enrollment scanner may be used to acquire a biometric input from a new user when the user initially joins an organization (e.g., as part of an employee intake procedure, as part of registration for classes, etc.). The enrollment scanner may be coupled to the server 106 through a network (e.g., the Internet, a local area network, etc.). Once a sufficient number of biometric inputs have been received, the product 102, the user device 104, or the other device generates a biometric template corresponding to the new user and transfers the biometric template to the server 106. The server 106 stores the biometric template in the biometric template module 174f. In other embodiments the biometric template is otherwise provided to the server 106.

When the product 102 is manufactured, or sometime thereafter, two keys (a secret or product key and an access or user key) can be generated and affiliated with the product 102. For example, the product key may each be related to a unique serial ID or other identification number for the product 102. The product key may be stored in the memory 114 of the product 102. In one embodiment, unique and/or randomly generated keys. In one embodiment, a unique code that represents the product 102 is generated (e.g., by server 106) and this unique code can be used to link the lock to its corresponding key. For example, such a unique code may be secured in the packaging of the product 102 so that a user may appropriately configure the product 102 and the user device 104. In one embodiment, a separate unique code is provided for each of the lock and user keys, and each unique code may be associated with their respective lock or user key by the manufacturer. In one embodiment, the server 106 also generates the lock and user keys. For example, the server 106 may provide a key generation service that may be accessed during the manufacturing process. The keys may be generated according to any generation algorithm; however, the product key and the user key are typically not derived from one another. After generation, the product key is only stored on server 106 and the product 102. The product key is not transmitted to the user device 104 in an unencrypted format. However, the user key may be provided to both the lock and the user device 104, but not stored on the lock.

In some embodiments, one user key is associated with each user. By way of example, the server 106 may generate the user key upon generation of the user profile for a user. The server 106 may store the user key(s) within the memory 174.

When the user profile, the biometric template, and/or the user key have all been generated and are stored in the memory 174 of the server 106, the server 106 associates the user profile, the biometric template, and/or the user key with one another. Each of the user profile, the biometric template, and/or the user key may be associated with a specific user.

The user profile, the user key, and/or the biometric template are encrypted using a product key and transferred to a user device 104 (204). The server 106 can encrypt the user profile, the user key, and/or the biometric template as a package using the product key and/or a handshake nonce in order to transform the user profile, the user key, and/or the biometric template into an encrypted package (e.g., ciphertext). In some embodiments, the user key and/or the handshake nonce are appended to the encrypted package. The package may be encrypted according to any known encryption standards. In an illustrative embodiment, the package is encrypted using CCM mode (NIST/FIPS counter mode encryption with cipher block chaining message authenticating code (MAC)) based algorithms, and the product key, which is used as the cipher key, has a length of 128 bits. Accordingly, the server 106 may encrypt the user profile, the user key, and/or the biometric template and also generate a MAC using the product key. Alternatively, other standards could also be used, such as performing encryption and generating a MAC with different keys.

The user profile, user key, and/or biometric template that were encrypted using the product key and/or the handshake nonce are transferred as an encrypted package to the user device 104 (204). Specifically, the server 106 transfers the encrypted package containing the user profile, the user key, and/or the biometric template to the user device 104. The server 106 may additionally transfer the unencrypted user key and/or the handshake nonce to the user device 104. In some embodiments, the server 106 transfers the encrypted package, the user key, and/or the handshake nonce automatically in response to the user device 104 connecting to the server 106. In other embodiments, the server 106 transfers the encrypted package, the user key, and/or the handshake nonce in response to a request from the user device 104 (e.g., initiated by a user through an application of the user device 104). The user device 104 then stores the encrypted package, the user key, and/or the handshake nonce locally in the memory 144. As shown in FIG. 6, the server 106 may transfer the encrypted package to multiple user devices 104.

In some embodiments, the server 106 only transfers the encrypted package to an authorized user device 104 or a user device 104 that is being used by an authorized user. The server 106 may store a listing of authorized user devices 104. Such a listing may be managed (e.g., user devices 104 may be given authorization or de-authorized) by an administrator (e.g., through a user device 104). Alternatively, a user device 104 may be authorized when an authorized user account has logged into that user device 104. The server 106 may store a listing of authorized user accounts. Further alternatively, the server 106 may require a user to provide an authorization password (e.g., through an interface of the user device 104) in order to authorize the user device 104 to receive the encrypted package.

The user device 104 transfers the encrypted package, the user key, and/or the handshake nonce to another user device 104 (206). The user device 104 may be configured to transfer the unencrypted user key, the handshake nonce, and/or the encrypted package to another authorized user device 104. In some embodiments, the first user device 104 transfers the encrypted package, the user key, and/or the handshake nonce automatically in response to the user devices 104 connecting to one another (e.g., both connecting to the same Wi-Fi network). In other embodiments, the first user device 104 transfers the encrypted package, the user key, and/or the handshake nonce in response to a request from the first or the second user device 104 (e.g., initiated through an application of the first or the second user device 104). The second user device 104 then stores the encrypted profile, the user key, and/or the handshake nonce locally in the memory 144. This process may repeat multiple times until multiple authorized user devices 104 have all stored the encrypted package, the user key, and/or the handshake nonce. In this way, the encrypted package can be distributed to a product 102 without the user device 104 that originally received the encrypted package being in direct communication with the product 102. In other embodiments, the user devices 104 are not permitted to transfer encrypted packages, user keys, and/or handshake nonces between one another, and step 206 is omitted.

The user device 104 transfers the encrypted package to the product 102 (208). One of the authorized user devices 104 that has received the encrypted package transfers the encrypted package to a product 102. The user device 104 that transfers the encrypted package to the product 102 may be the user device 104 that originally received the encrypted package from the server 106 or another authorized user device 104 that received the encrypted package from a user device 104. Accordingly, the product 102 may receive the encrypted package from whichever of the user devices 104 that establishes a connection with the product 102 first. If biometric template is already present in the memory 114, the product 102 may not store one or more of the user profile, the user key, or the biometric template redundantly. The product 102 may either replace the current biometric template or discard the duplicate biometric template.

In some embodiments, the user device 104 requires a specific interaction or command from a user to transfer the encrypted package to the product 102. By way of example, an application of the user device 104 may include a setting or option to reconfigure the user device 104 into a specific mode of operation (e.g., an update mode). Once in the update mode, the user device 104 will attempt establish a connection with the product 102. Once the connection has been established, the user device 104 will transfer the encrypted package to the product 102. Alternatively, if the user device 104 has established a connection with the product 102 prior to entering the update mode, the user device 104 may transfer the encrypted package automatically upon entering the update mode. In other embodiments, the user device 104 automatically transfers the encrypted package to the product 102 in response to a connection being established between the user device 104 and the product 102 (e.g., without a specific input from a user). By way of example, an application on the user device 104 may repeatedly attempt to connect to the product 102. Once the application has confirmed that the connection has been established, the user device 104 may automatically transfer the encrypted package to the product 102.

The product 102 decrypts the encrypted package using the product key prestored thereon and/or the handshake nonce sent along with the encrypted package to obtain the user profile, user key, and/or biometric template from the decrypted package (210). After receiving the encrypted package, the product 102 uses the product key, which was previously stored in the memory 114, to decrypt the encrypted package, retrieving the user profile, user key, and/or biometric template. Once the user profile, the user key, and/or the biometric template have been decrypted, the product 102 can store the user profile (e.g., temporarily), the user key (e.g., temporarily), and/or the biometric template (e.g., indefinitely until removed or updated) in the memory 114. In some embodiments, the product 102 is configured verify the integrity of the decrypted data, for example, by using a MAC validation scheme, running a CRC check, etc., on the decrypted data. Such a MAC validation scheme also allows the user device 104 and the product 102 to verify that the data originated from its proper source (i.e., the other holder of the key used to generate the MAC, etc.).

Once the product 102 has decrypted the encrypted package, the process 200 can continue along one of at least three paths (i.e., the product 102 can perform one of at least three actions). Once one path has been completed, the process 200 may repeat that path or continue onto another path. By way of example, the process 200 may complete the first path twice, then complete the third path and the second path. The path that is selected may vary depending upon user inputs (e.g., to the product 102 or the user device 104), which devices are connected to the product 102, or other factors.

In the first path, the encrypted package includes the biometric template and may include the user profile and the user key. As such, a user may provide a biometric input to the product 102 or to a user device 104 that is in communication with the product 102, and the product 102 determines if the biometric input matches one of the biometric templates stored on the product 102. If the product 102 determines that the biometric input matches one of the biometric templates, then the product 102 permits the user to access the product 102 (e.g., open the lock mechanism 128). This process is detailed with reference to the process 700 described herein.

In the second path, the encrypted package does not include the biometric template, but includes the user profile and user key. The product 102 may optionally generate and transmit a reply nonce to the user device 104 (e.g., in embodiments where the package is encrypted with the handshake nonce) in response to successfully decrypting the encrypted package with the product key and/or the handshake nonce (220). The user device 104 may optionally generate the biometric template (e.g., in embodiments where the server 106 does not transmit the biometric template with the encrypted package) via the biometric interface 154 of the user device 104. By way of example, a user may provide a command through an application of the user device 104. The user device 104 then encrypts the command using the user key that was provided to the user device 104 by the server 106 and/or a modified reply nonce generated by the user device 104 based on the reply nonce received from the product 102 (in embodiments where the product 102 transmits the reply nonce) and provides the encrypted command to the product 102 (224). The product 102 decrypts the encrypted command with the user key retrieved from the decrypted package and/or a modified reply nonce independently generated by the product 102 based on the reply nonce (226). By encrypting the command with the user key present on the user device 104 and decrypting the command with the user key present on the product 102, the system 100 verifies that the command is sent from an authorized device and received by an authorized device. The product 102 performs an action associated with the command (228). In one embodiment, the command is to store the biometric template included with the encrypted command (e.g., generated at the user device 104 at 222, generated by the server 106 but not transmitted with the encrypted package, etc.). In another embodiment, the command is to locally generate the biometric template (e.g., in embodiments where the server 106 does not transmit the biometric template with the encrypted package, the user device 104 does not generate the biometric template, etc.) via the biometric interface 124 of the product 102 and store the biometric template. The process may then proceed to process 700.

In the third path, the product 102 transfers the decrypted user profile, user key, and/or biometric template to a second product 102 (230). The products 102 in a given location (e.g., a room, two adjacent rooms, etc.) may be configured such that they are in communication with one another (e.g., constantly, at regular intervals, etc.). The products 102 may be in direct communication with one another, or may be in communication with one another indirectly (e.g., through a third product 102). By way of example, a locker room may contain multiple products 102 positioned within a short distance of one another, facilitating certain types of communication (e.g., Bluetooth, etc.) between all of the products 102. The products 102 that are connected to one another may be configured to transfer the decrypted user profile, user key, and/or biometric template to one another until all of the connected products 102 have stored the decrypted user profile, user key, and/or biometric template. In this way, the user profile, user key, and/or biometric template can be distributed throughout a large population of products 102 without a user having to transfer data to each product 102 individually.

The products 102 may be configured to transfer the decrypted user profile, user key, and/or biometric template only to certain authorized products 102. In some embodiments, the products 102 are configured to transfer the decrypted user profile, user key, and/or biometric template to all of the interconnected products 102, and an administrator only connects products 102 to one another that have the same authorization. In other embodiments, the encrypted package received by the first product 102 contains a listing of other authorized products 102 that the decrypted user profile, user key, and/or biometric template should be distributed to. In such embodiments, the product 102 that initially received the encrypted package may be configured to automatically send the decrypted user profile, user key, and/or biometric template to the authorized products 102 when in direct communication with the authorized products 102.

In some embodiments, the product 102 is configured to encrypt the user profile, user key, and/or biometric template prior to transferring them to another product 102. By way of example, a first product 102 (e.g., the product 102 containing the decrypted user profile, user key, and/or biometric template) may be supplied with a copy of the product key of another product 102 (e.g., during manufacture of the products 102). The first product 102 may then use the product key of the second product 102 to encrypt the user profile, user key, and/or biometric template. The first product 102 then transfers the encrypted package to the second product 102. The second product 102 can then decrypt the package using its own product key and store the information contained therein locally.

In some embodiments, the system 100 is configured to de-authorize certain users and/or biometric templates from accessing the products 102. By way of example, an authorized user (e.g., an administrator) may interact with a user device 104 such that the user device 104 sends a command to a product 102 to de-authorize a specific user and/or biometric template. In one such example, the user interacts with an application, selecting a particular user that should be de-authorized. By way of another example, the server 106 may maintain a list of users that should be de-authorized. An authorized user device 104 may be configured to retrieve this list from the server 106 and send a command to a product 102 to de-authorize any users and/or corresponding biometric templates when the user device 104 is connected to the product 102. In some embodiments, this interaction occurs in the background without a specific interaction from a user. By way of another example, the product 102 may utilize the schedule contained in the user profile to determine a time range that the corresponding biometric template may be used to access the product 102. After the time range has expired, the product 102 may de-authorize the user and corresponding biometric template from accessing the product 102. The time range may be determined by the server 106 when generating the user profile. The product 102 may be configured to use the timer 116, the timer 146, or the timer 176 to track the date and time and determine when the time range has expired.

In certain situations, one or more of the products 102 may contain one or more biometric templates that are not stored in the server 106. By way of example, a user may enroll at a product 102 without the biometric template created during the enrollment being transferred to the server 106 (e.g., using the process 300 or the process 400). It may be desirable to distribute that biometric template throughout other products 102 of the system 100 without the user enrolling at another device within the system 100. When a product 102 is connected to a user device 104 or to the server 106, the product 102 may be configured to transfer biometric audit data to the user device 104 or to the server 106 (e.g., directly, through the user device 104, etc.). The biometric audit data may include information such as a list of the users having corresponding biometric templates, when each user enrolled on the product 102, a list of dates/times that certain biometric templates have been used to access the product 102, or the biometric templates themselves. The user device 104 and/or the server 106 may be configured to compare the biometric templates that are stored on the product 102 with the biometric templates that are present on the server 106. If one or more biometric templates present on the product 102 are not stored on the server 106, the user device 104 and/or the server 106 may be configured to transfer the new biometric templates to the server 106 for storage. The server 106 may then distribute those biometric templates to other products 102 using any of the processes described herein.

In other embodiments, process 200 is used to distribute the biometric template and user key from the server 106 to the product 102, but the user profile is omitted from the encrypted package. In such embodiments, the biometric templates that are transferred to product 102 are associated with specific users (e.g., for audit trail recording). In such embodiments, the encrypted package may include information that identifies the user (e.g., a user identification number, a name of the user, etc.). In other embodiments, the biometric templates are transferred to the product 102 without identifying a specific corresponding user.

Configuration 2

Figure 8:
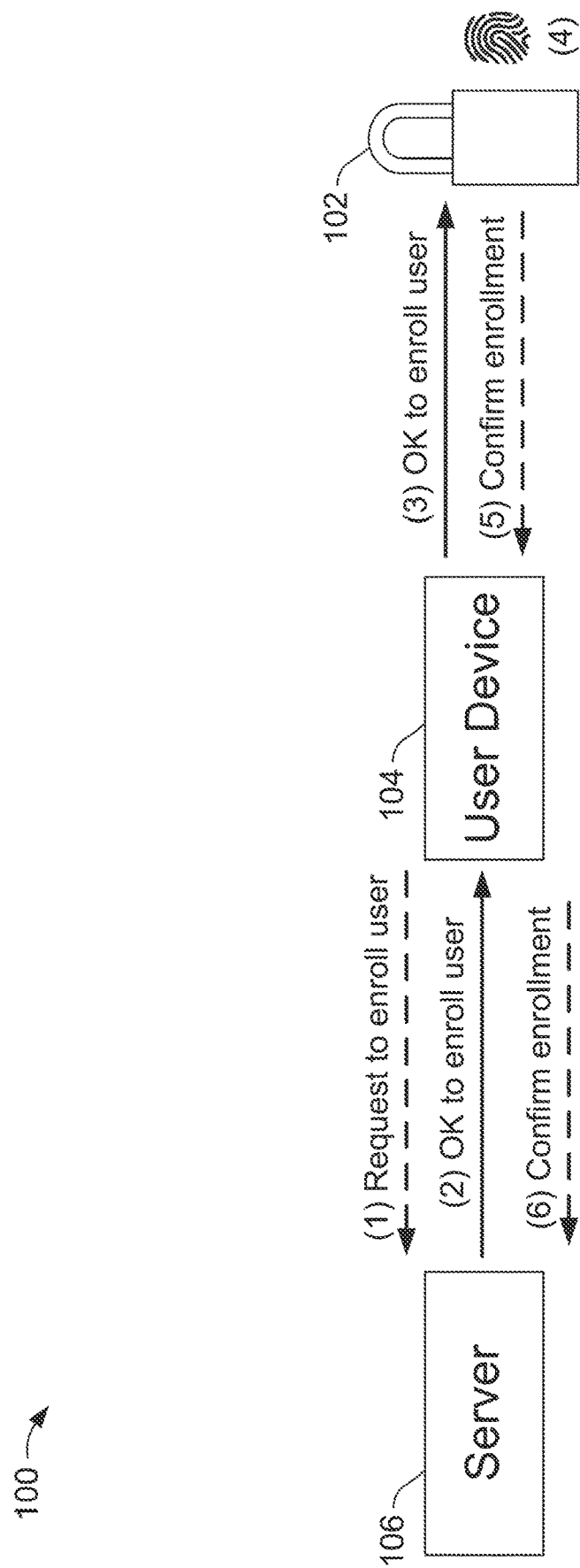
FIG. 8 is a block diagram of the system of FIG. 1 in a second configuration, according to an exemplary embodiment.
Figure 9:
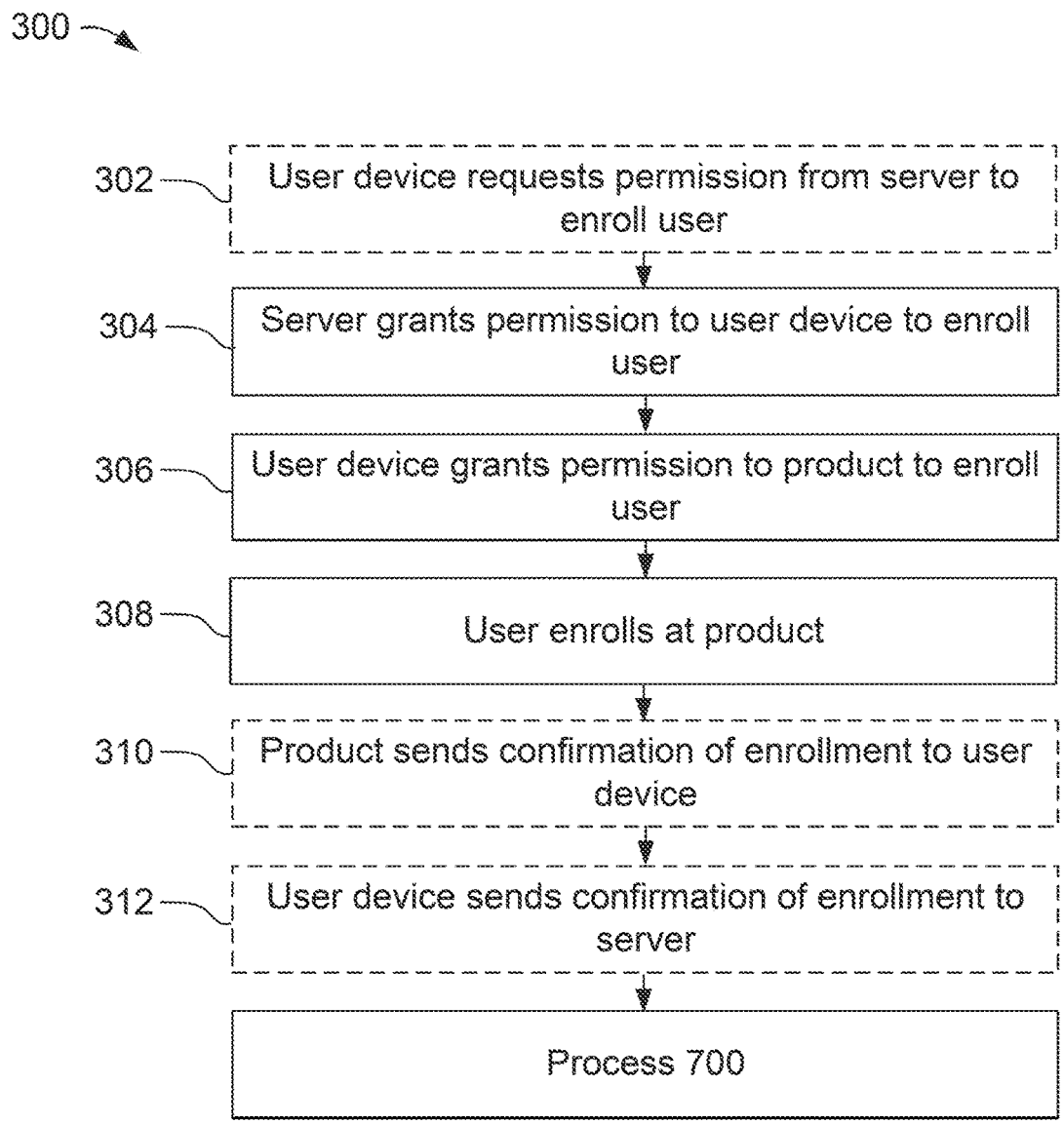
FIG. 9 is a flow diagram of a process for distributing biometric templates throughout the system of FIG. 8, according to an exemplary embodiment.

FIG. 8 illustrates a second configuration of the system 100. Referring to FIG. 9, a flow diagram of an illustrative process 300 for distributing biometric templates throughout the system 100 of FIG. 8 is shown, according to an exemplary embodiment. In alternative embodiments, fewer, additional, and/or different steps may be performed. Also, the use of a flow diagram is not meant to be limiting with respect to the order of steps performed.

In this configuration, a product 102 communicates directly with a user device 104, and the user device 104 communicates directly with a server 106. A user uses the user device 104 to request to enroll a new user. The server 106 validates the request, sending an approval to the user device 104, which in turn sends an approval to the product 102 to begin enrollment. The new user enrolls at the product 102, creating a biometric template. The product 102 sends a confirmation of successful enrollment to the user device 104, which in turn sends a confirmation of successful enrollment to the server 106.

The user device 104 requests permission from the server 106 to enroll the new user (302). Specifically, the user device 104 establishes a connection with the server 106 and sends a request to the server 106 for permission to enroll a new user of the product 102. The user may be the new user that will be enrolling at the product 102, or the user may be an administrator (e.g., a safety manager, a human resources representative, a school counselor, etc.) that is managing the enrollment of the new user. The user may initiate the request of step 302 through interaction with an application on the user device 104 (e.g., through interaction with the user input device 156, etc.). As part of the request, an administrator may be required to provide some sort of authentication input (e.g., an administrator password, a biometric input, etc.) that confirms the identity of the administrator requesting the permission to enroll.

The request may also include information that identifies the new user. Such information may include the user's name, an employee identification number, the identities of any other products 102 that the new user wishes to request access to, etc. This information may be entered through the application on the user device 104 (e.g., through interaction with the user input device 156, etc.). Alternatively, the request may require a selection of the new user from a user database already stored on the server 106 in the profile module 174c. The user database may contain a list of known users and information that corresponds to the known users. By way of example, the user database may be an employee database that contains employee names, job titles, and associated access permissions.

The server 106 grants permission to the user device 104 to enroll the new user (304). Specifically, the server 106 evaluates the request to determine if permission should be granted. If the server 106 determines that the permission should be granted, then the server 106 sends a signal to the user device 104 indicating that permission has been granted to enroll the new user. The server 106 may evaluate the information provided in the request to determine if the permission should be granted. By way of example, the server 106 may give permission to certain administrators to enroll new users. The server 106 may evaluate the authentication input provided in the request to validate that the request was issued by an administrator. By way of another example, the server 106 may evaluate the information provided about the new user to determine if the new user should be enrolled. The server 106 may compare this information against the information stored in the profile module 174c to determine if the new user is a known user that should be enrolled. The server 106 may require that information identifying the new user is entered into the profile module 174c prior to enrollment of the new user.

Alternatively, the step 302 may be omitted from the process 300. In such an embodiment, the server 106 may automatically grant permission to certain user devices 104 and products 102 to enroll new users without the user device 104 having to request permission. By way of example, the server 106 may identify specific user devices 104 as having permission to enroll new users. By way of another example, the server 106 may identify specific administrators as having permission to enroll new users. The server 106 may give permission to a specific user device 104 to enroll new users when an authorized administrator logs into the user device 104. In such embodiments, the server 106 and the user device 104 may be configured to revoke the permissions of the user device 104 to enroll new users when the connection between the user device 104 and the server 106 is interrupted.

The user device 104 grants permission to the product 102 to enroll the new user (306). Specifically, the user device 104 establishes a connection with the product 102 and sends a signal to the product 102 indicating that permission has been granted to enroll the new user. To begin the connection, a user (e.g., an administrator, the new user, etc.) may interact with an interface of the product 102 (e.g., the biometric interface 124 or the user input device 126, etc.) to wake the product 102 from a low power state. Alternatively, the user may interact with an interface of the user device 104 (e.g., the user input device 156, etc.), causing the user device 104 to send a signal to the product 102 to wake it from its low power state. Alternatively, the connection may be established automatically when the user device 104 is within a threshold range of the product 102.

The user may then interact with the product 102 and/or the user device 104 to enter the product 102 into an enrollment mode. Prior to entering the enrollment mode, the product 102 may communicate with the user device 104 to determine if permission to enroll the new user has been granted. Once the product 102 determines that the permission has been granted, the product 102 enters the enrollment mode. When sending the signal indicating that the permission has been granted, the user device 104 may also provide information to the product 102 identifying the new user (e.g., a user identification number, a name, etc.).

The new user enrolls at the product 102 (308). Specifically, once in the enrollment mode, the new user enrolls at the product 102. To enroll, the new user provides a biometric input to the product 102 through the biometric interface 124. The biometric interface 124 may be configured to determine when a biometric input is being provided, or a user may interact with the user input device 126 or the user input device 156 to confirm that the biometric input is being provided. The product 102 may require that the same biometric input be provided multiple times (e.g., the same fingerprint is scanned multiple times, etc.) to confirm that the product 102 has received the biometric input accurately. If a biometric input is not of a sufficient quality, the product 102 and/or the user device 104 may require that the new user provides the biometric input again. The product 102 may also give the new user the option to provide alternative biometric inputs (e.g., the fingerprints of multiple different fingers, the images of different eyes, etc.). Once all of the biometric inputs have been received, the product 102 generates a biometric template corresponding to the new user and stores the biometric template in the biometric template module 114f. The product 102 may associate the biometric template with a corresponding user. In this way, the product 102 can track which users have accessed the product 102.

The product 102 sends confirmation of enrollment to the user device 104 (310), and the user device 104 sends confirmation of enrollment to the server 106 (312). The sending of a confirmation to the user device 104 or the server 106 confirms that the enrollment was successful. The confirmation may include information that is specific to a particular enrollment occurrence. By way of example, the confirmation may include information that specifically identifies the user that was enrolled (e.g., an employee identification number, a name, etc.). In some embodiments, the confirmation includes a copy of the biometric template that was generated during the enrollment. By transferring the biometric template to the server 106, the biometric template may be stored in the biometric template module 174f and transferred to other products 102 using any of the processes discussed herein. In other embodiments, steps 310 and/or steps 312 are omitted. Before or after steps 310 and 312 have been completed, the product 102 may complete the process 700.

Figure 10:
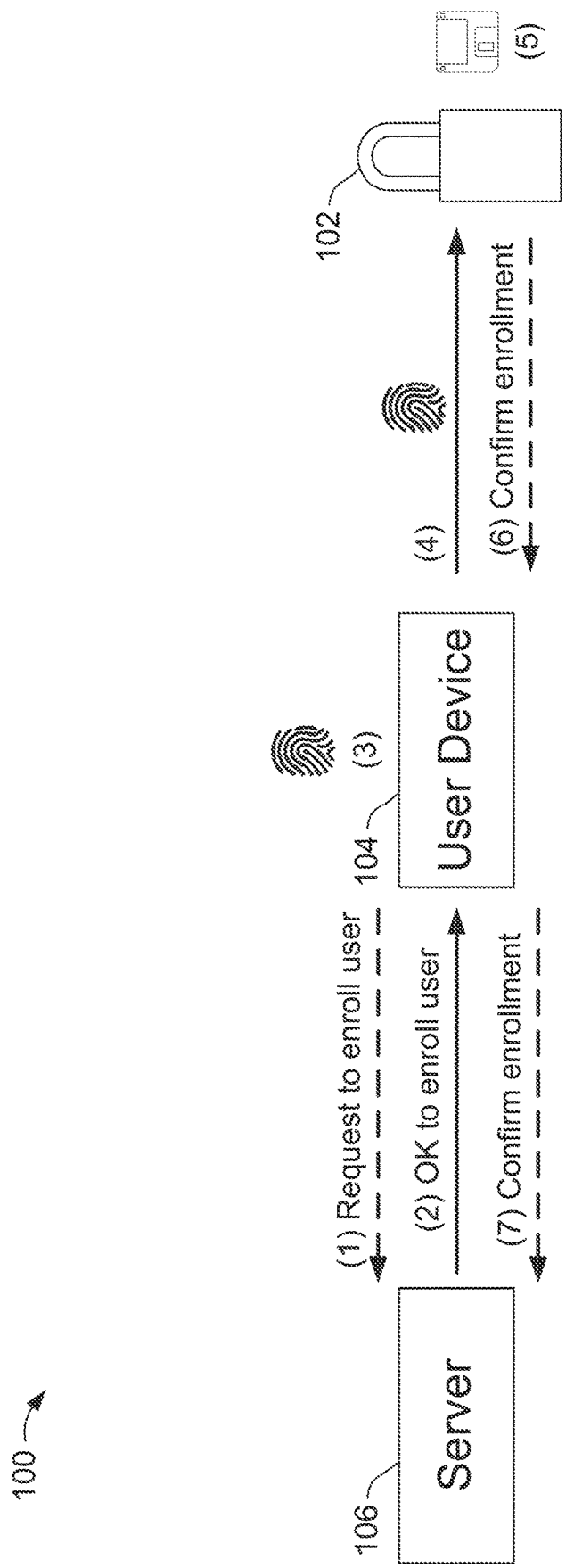
FIG. 10 is a block diagram of the system of FIG. 1 in the second configuration, according to another exemplary embodiment.
Figure 11:
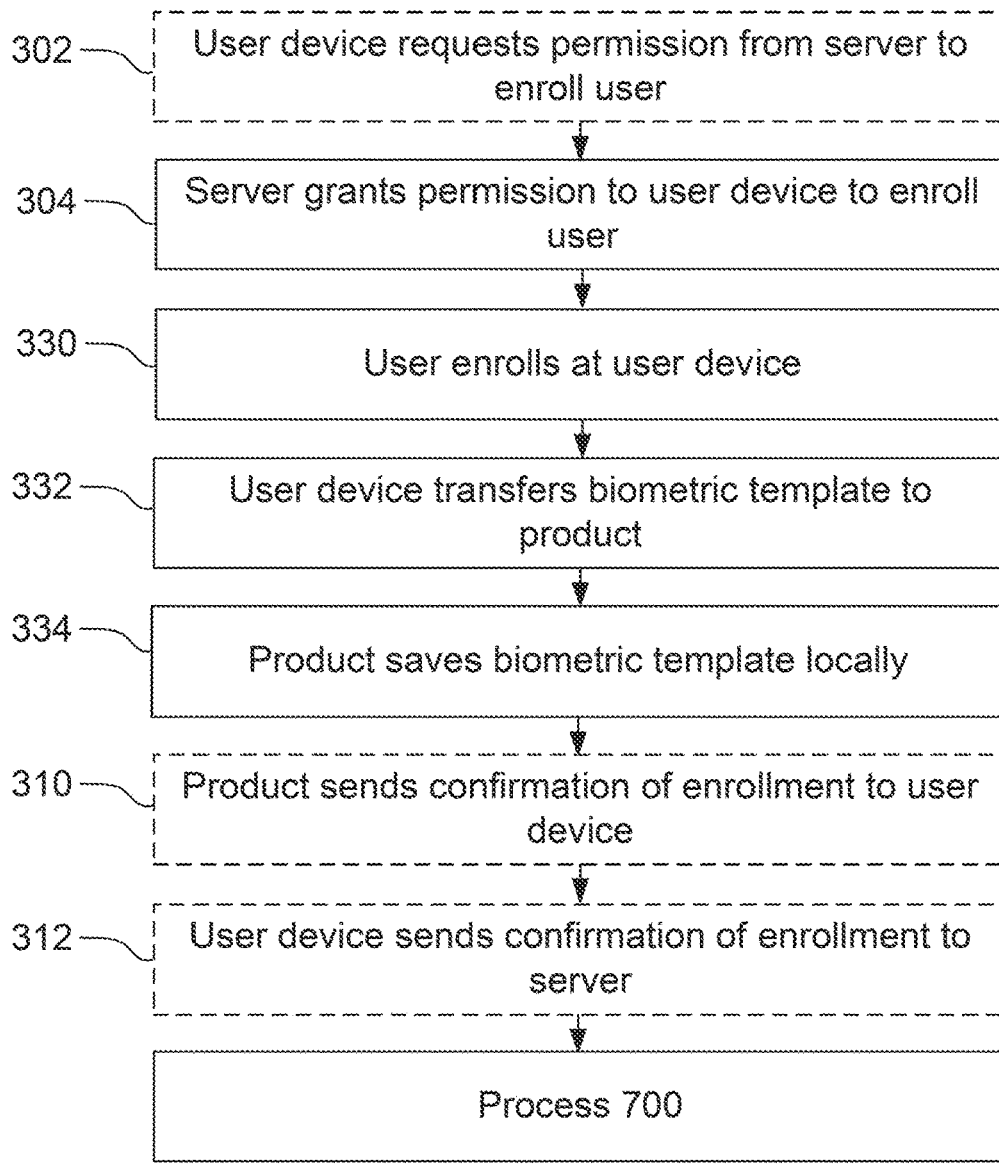
FIG. 11 is a flow diagram of a process for distributing biometric templates throughout the system of FIG. 10, according to an exemplary embodiment.

FIG. 10 illustrates an alternative embodiment of the second configuration of the system 100 in which the biometric templates are distributed according to an alternative embodiment of the process 300, shown in FIG. 11. The process 300 shown in FIG. 11 is substantially similar to the process 300 shown in FIG. 9, except as otherwise stated herein. Specifically, steps 306 and 308 are replaced with steps 330, 332, and 334. In this embodiment, the enrollment occurs at the user device 104, and the biometric template is transferred from the user device 104 to the product 102 where the biometric template is saved locally.

After the server 106 grants permission to the user device 104 to enroll the new user (304), the new user may then interact with the user device 104 to enter the user device into an enrollment mode. The new user then enrolls at the user device 104 (330). To enroll, the new user provides a biometric input to the user device 104 through the biometric interface 154. The biometric interface 154 may be configured to determine when a biometric input is being provided, or a user may interact with the user input device 156 to confirm that the biometric input is being provided. The user device 104 may require that the same biometric input be provided multiple times (e.g., the same fingerprint is scanned multiple times, etc.) to confirm that the user device 104 has received the biometric input accurately. If a biometric input is not of a sufficient quality, the user device 104 may require that the new user provides the biometric input again. The user device 104 may also give the new user the option to provide alternative biometric inputs (e.g., the fingerprints of multiple different fingers, the images of different eyes, etc.).

Once all of the biometric inputs have been received, the user device 104 generates a biometric template corresponding to the new user and may store the biometric template in the biometric template module 114f. The user device 104 may associate the biometric template with information that identifies the corresponding user (e.g., a user identification number, a name, etc.). In this way, the user device 104 and/or the product 102 can track which users have accessed the product 102.

The user device 104 transfers the biometric template to the product 102 (332). If the user device 104 is connected to the product 102 when the user device 104 generates the biometric template, then the user device 104 may automatically transfer the biometric template to the product 102. Alternatively, the user device 104 may store the biometric template locally and automatically transfer the biometric template to the product 102 when the user device 104 is next connected to the product 102. Further alternatively, the user device 104 may store the biometric template locally and transfer the biometric template to the product 102 in response to a user request (e.g., received through the user input device 156, etc.). The product 102 then saves the biometric template locally (334).

In some embodiments, the product 102 is configured to de-authorize certain users from accessing the product 102. By way of example, a user may be de-authorized upon termination of their employment with a company that owns the system 100. This removes the biometric template or templates associated with the user from the biometric template module 114*f* of the product 102. The product 102 may be configured to de-authorize specific users, or to de-authorize all users.

In some embodiments, the product 102 is configured to receive commands from the user device 104 and/or the server 106 to de-authorize one or more users. The product 102 may be configured to provide a listing of all the current authorized users to the user device 104 and/or the server 106. The user device 104 and/or the server 106 may then permit an administrator to select which users to de-authorize. Alternatively, the user device 104 and/or the server 106 may issue a command to de-authorize all of the current users.

In some embodiments, the product 102 is configured to receive commands locally to de-authorize one or more users. Using the user input device 126, an administrator can enter a de-authorization code which changes the product 102 to a de-authorization mode. The de-authorization code may be stored on the product 102 (e.g., in the enrollment code module 114*e*). Once the product 102 is in the de-authorization mode, the administrator can enter one or more user identification codes. Each user identification code is specific to a user of the product 102, such that, once the user identification code is entered, the corresponding user is de-authorized from the product 102. In an alternative embodiment, the product 102 automatically de-authorizes all of the users when the de-authorization code is entered.

In other embodiments, the product 102 is configured to automatically de-authorize a biometric template and/or a corresponding user. By way of example, the product 102 may automatically de-authorize after a set time period from when the user is enrolled. By way of another example, the product 102 may automatically de-authorize at a certain time and/or date. By way of yet another example, the product 102 may automatically de-authorize after the user has accessed the product 102 a threshold number of times. The set time period, the time and/or date of de-authorization, and the threshold number of accesses may be set by an administrator (e.g., during manufacture, during an initial setup, transferred from a user device 104 or a server 106, transferred as part of the permission to enroll the new user, etc.).

Configuration 3

Figure 12:
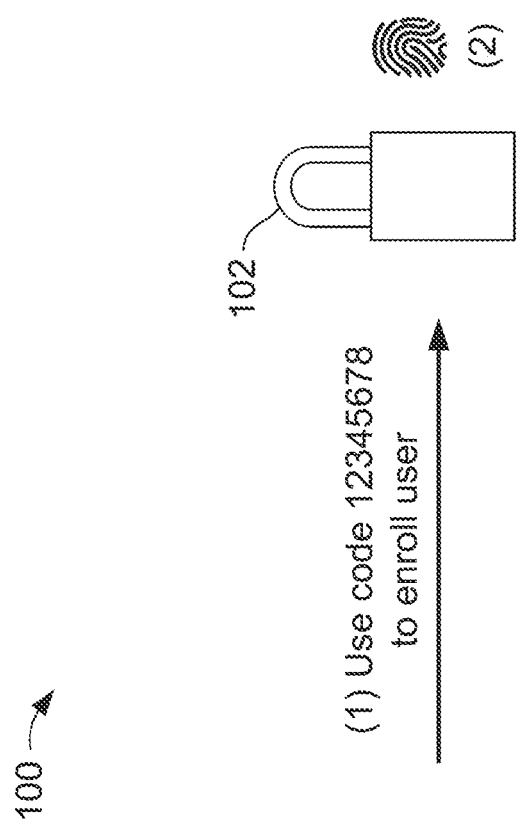
FIG. 12 is a block diagram of the system of FIG. 1 in a third configuration, according to an exemplary embodiment.
Figure 13:
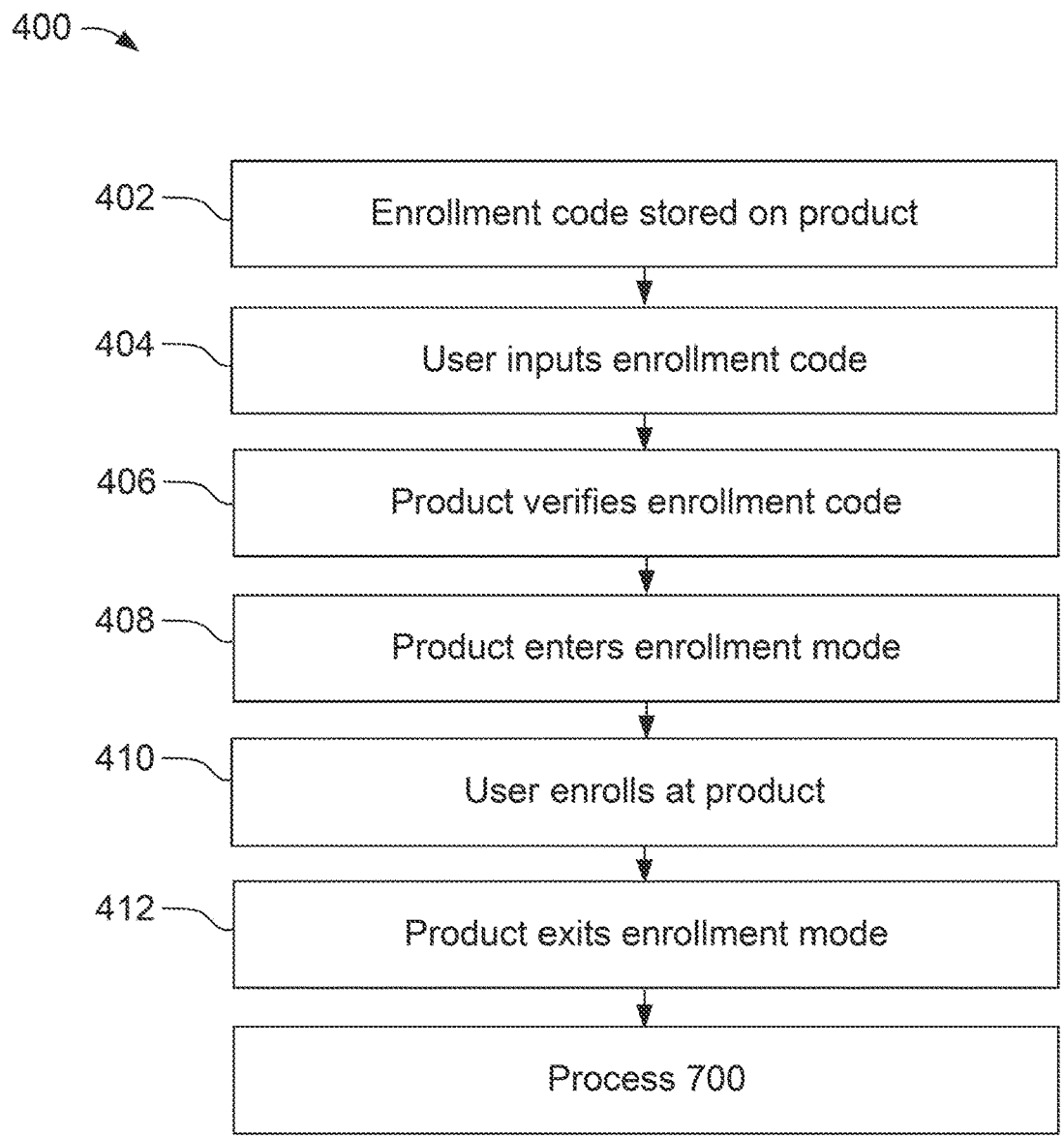
FIG. 13 is a flow diagram of a process for distributing biometric templates throughout the system of FIG. 12, according to an exemplary embodiment.

FIG. 12 illustrates a third configuration of the system 100. Referring to FIG. 13, a flow diagram of an illustrative process 400 for distributing biometric templates throughout the system 100 of FIG. 12 is shown, according to an exemplary embodiment. In alternative embodiments, fewer, additional, and/or different steps may be performed. Also, the use of a flow diagram is not meant to be limiting with respect to the order of steps performed.

In this configuration, a product 102 can be used on its own without connection to a user device 104 or a server 106. A user inputs an enrollment code into the product 102, which causes the product 102 to enter an enrollment mode. Once in the enrollment mode, a new user can enroll at the product 102. The product exits the enrollment mode and can be used normally. This configuration is advantageous in situations where not every user has access to a user device and/or where it may be difficult to connect a device to a server 106.

An enrollment code is stored on the product 102 (402). The enrollment code is a code that can be entered into the product 102 through the user input device 126 (e.g., a number, a mixture of numbers and other characters, a swiping pattern, a pattern of button presses, etc.). In such embodiments, the enrollment code is not a biometric input such that the enrollment code can be provided by any user, not just users whose biometric characteristics are known. The enrollment code may be any length, and the length of the enrollment code may be set to achieve a desired ease of use (e.g., such that the enrollment code is easy to remember) and a desired level of security (e.g., the enrollment code is lengthened to increase the resistance of the enrollment code to random guessing).

In some embodiments, the system 100 utilizes only one enrollment code. This enrollment code is used to enroll all users. When updating the audit trail to log access attempts by a particular user, the login attempts may be associated with the biometric template of the user (e.g., the biometric template that matches the biometric input). In other embodiments, the system 100 utilizes multiple enrollment codes. Different enrollment codes may be used by different users. By way of example, each administrator may have a different enrollment code so the system 100 can identify which administrator enrolled which new users. By way of another example, each user may be given an enrollment code. In such embodiments, when updating the audit trail to log access attempts by a particular user, the login attempts may be associated with the biometric template of the user and the enrollment code that was used to enroll the user.

In one embodiment, one or more enrollment codes are stored in the enrollment code module 114*e* of the memory 114 when the product 102 is manufactured. The manufacturer may select one or more randomly generated enrollment codes. Alternatively, the manufacturer may select one or more enrollment codes according to a customer's specifications. By way of example, a company may purchase multiple products 102 and request that all of the products 102 use the same enrollment code. By way of another example, the customer may request one or more specific enrollment codes. In this embodiment, the manufacturer may include the enrollment codes within the packaging of the product 102. An administrator in charge of the system 100 may track the enrollment codes of each product 102 to facilitate enrollment of users. By way of example, the administrator may enter the enrollment codes into a user device 104, which transfers the enrollment codes to the server 106, which stores the enrollment codes. When the enrollment codes are stored, the enrollment codes may be associated with an identification number (i.e., ID number) of the product 102. This facilitates retrieving the correct enrollment codes if the system 100 includes multiple products 102.

In another embodiment, a master code is stored in the enrollment code module 114*e* of the memory 114 when the product 102 is manufactured. The manufacturer may select a randomly generated master code. Alternatively, the manufacturer may select a master code according to a customer's specifications. The manufacturer may include the master code within the packaging of the product 102. When the master code is entered into the product 102 (e.g., through the user input device 126, etc.), the product 102 enters an enrollment code entry mode. Once in the enrollment code entry mode, the administrator can edit, delete, or add enrollment codes through the user input device 126. The administrator may then choose to exit the enrollment code entry mode through the user input device 126.

In another embodiment, one or more enrollment codes are created by the server 106 and transferred to the product 102. By way of example, the enrollment codes and/or one or more user profiles may be encrypted by the server 106 using the product key. The encrypted package may be transferred to the user device 104, which in turn transfers the encrypted package to the product 102. The product 102 may then decrypt the package using the product key and store the user profiles and enrollment codes locally. By way of another example, the product 102 may be configured to communicate directly with the server 106. The server 106 may transfer the enrollment codes directly to the product 102. In such an embodiment, the server 106 may communicate (e.g., directly, indirectly) with the product 102 to edit the enrollment codes stored on the product 102. By way of example, the server 106 may edit, delete, or add enrollment codes.

The user inputs an enrollment code (404). The user may input an enrollment code using the user input device 126 (e.g., a keypad, a touch screen, etc.). Alternatively, the user may input an enrollment code into a user device 104, and the user device 104 may transfer the enrollment code to the product 102. The product 102 verifies or validates the enrollment code (406). Specifically, the product 102 compares the provided enrollment code with the one or more enrollment codes stored in the enrollment code module 114e. If the provided enrollment code matches one of the stored enrollment codes, the product 102 enters the enrollment mode (408).

The user 410 enrolls at the product 102 (410). Specifically, once in the enrollment mode, the new user is enrolled onto the product 102. To enroll, the new user provides a biometric input to the product 102 through the biometric interface 124. The biometric interface 124 may be configured to determine when a biometric input is being provided, or a user may interact with the user input device 126 or the user input device 156 to confirm that the biometric input is being provided. The product 102 may require that the same biometric input be provided multiple times (e.g., the same fingerprint is scanned multiple times, etc.) to confirm that the product 102 has received the biometric input accurately. If a biometric input is not of a sufficient quality, the product 102 and/or the user device 104 may require that the new user provides the biometric input again. The product 102 may also give the new user the option to provide alternative biometric inputs (e.g., the fingerprints of multiple different fingers, the images of different eyes, etc.).

Once all of the biometric inputs have been received, the product 102 generates a biometric template corresponding to the new user and stores the biometric template in the biometric template module 114f. The product 102 may associate the biometric template with the enrollment code that was used to enter the product 102 into the enrollment mode. In this way, the product 102 can track which users have accessed the product 102.

The product 102 exits the enrollment mode (412). Specifically, the product 102 exits the enrollment mode and enters the low power standby/sleep state or the fully operational, awake state. By way of example, the product 102 may automatically exit the enrollment mode after the biometric template has been successfully created. By way of another example, the product 102 may automatically exit the enrollment mode after a predetermined period of inactivity (e.g., a predetermined period in which no inputs are received through the biometric interface 124 or the user input device 126). By way of yet another example, a user may request to exit the enrollment mode by interacting with the user input device 126 (e.g., by pressing an "Enter" button or an "Exit" button, etc.). After the product 102 exits the enrollment mode, the product 102 can complete the process 700.

In some embodiments, the product 102 is configured to de-authorize certain users from accessing the product 102. By way of example, a user may be de-authorized upon termination of their employment with a company that owns the system 100. This removes the biometric template or templates associated with the user from the biometric template module 114f of the product 102. The product 102 may be configured to de-authorize specific users, or to de-authorize all users.

In some embodiments, the product 102 is configured to receive commands from the user device 104 and/or the server 106 to de-authorize one or more users. The product 102 may be configured to provide a listing of all the current authorized users to the user device 104 and/or the server 106. The user device 104 and/or the server 106 may then permit an administrator to select which users to de-authorize. Alternatively, the user device 104 and/or the server 106 may issue a command to de-authorize all of the current users.

In some embodiments, the product 102 is configured to receive commands locally to de-authorize one or more users. Using the user input device 126, an administrator can enter a de-authorization code which changes the product 102 to a de-authorization mode. The de-authorization code may be stored on the product 102 in a similar way to the master code. Once the product 102 is in the de-authorization mode, the administrator can enter one or more user identification codes. Each user identification code is specific to a user of the product 102, such that, once the user identification code is entered, the corresponding user is de-authorized from the product 102. In some embodiments, the master code and the de-authorization code are the same code and an administrator can edit, delete, and add enrollment codes and de-authorize users in the same mode. In an alternative embodiment, the product 102 automatically de-authorizes all of the users when the de-authorization code is entered.

In other embodiments, the product 102 is configured to automatically de-authorize a biometric template and/or a corresponding user. By way of example, the product 102 may automatically de-authorize after a set time period from when the user is enrolled. By way of another example, the product 102 may automatically de-authorize at a certain time and/or date. By way of yet another example, the product 102 may automatically de-authorize after the user has accessed the product 102 a threshold number of times. The set time period, the time and/or date of de-authorization, and the threshold number of accesses may be set by an administrator (e.g., during manufacture, during an initial setup, transferred from a user device 104 or a server 106, set using a keypad on the product 102, etc.).

Configuration 4

Figure 14:
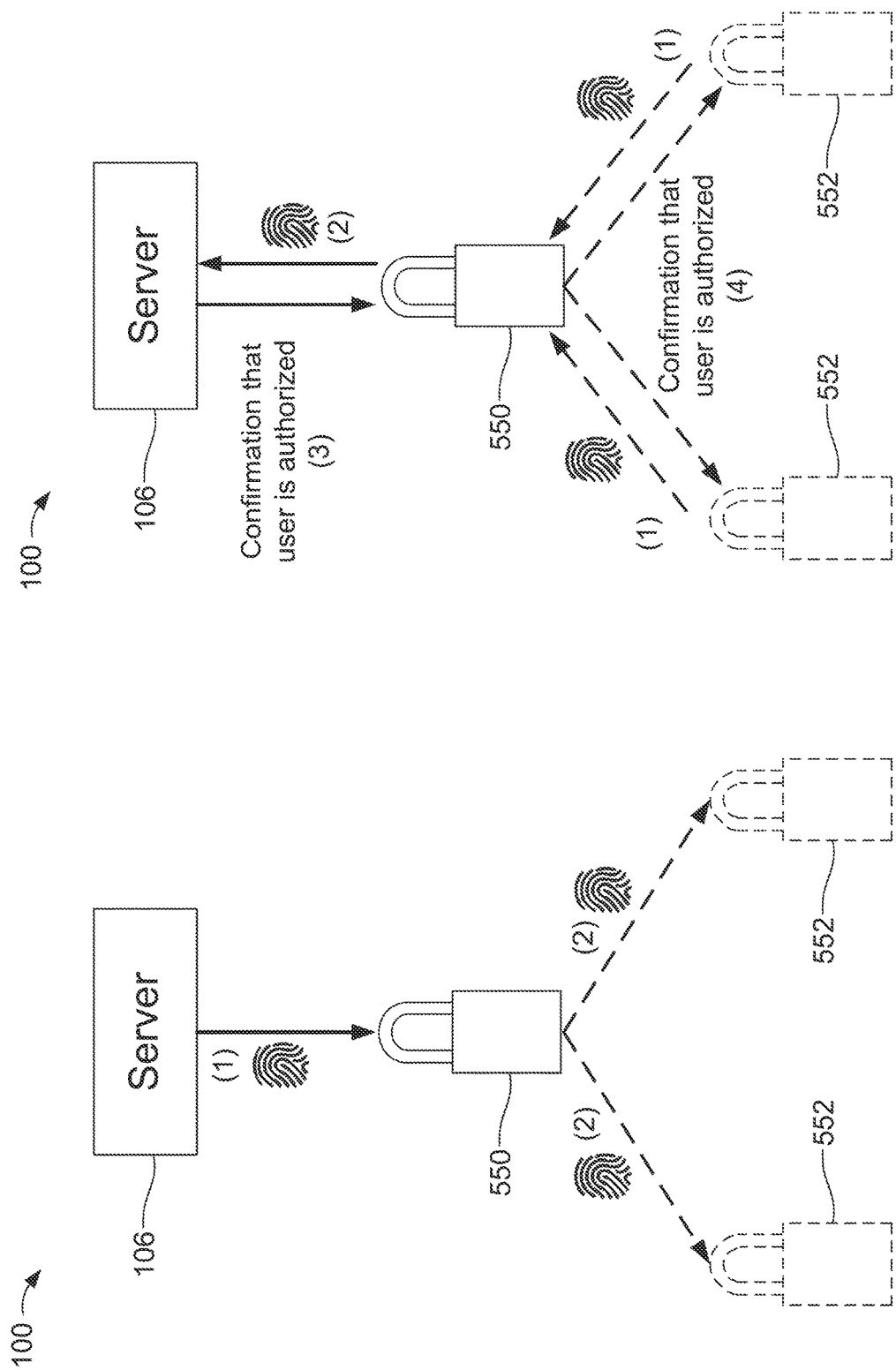
FIG. 14 is a block diagram of the system of FIG. 1 in a fourth configuration, according to an exemplary embodiment.
Figure 15:
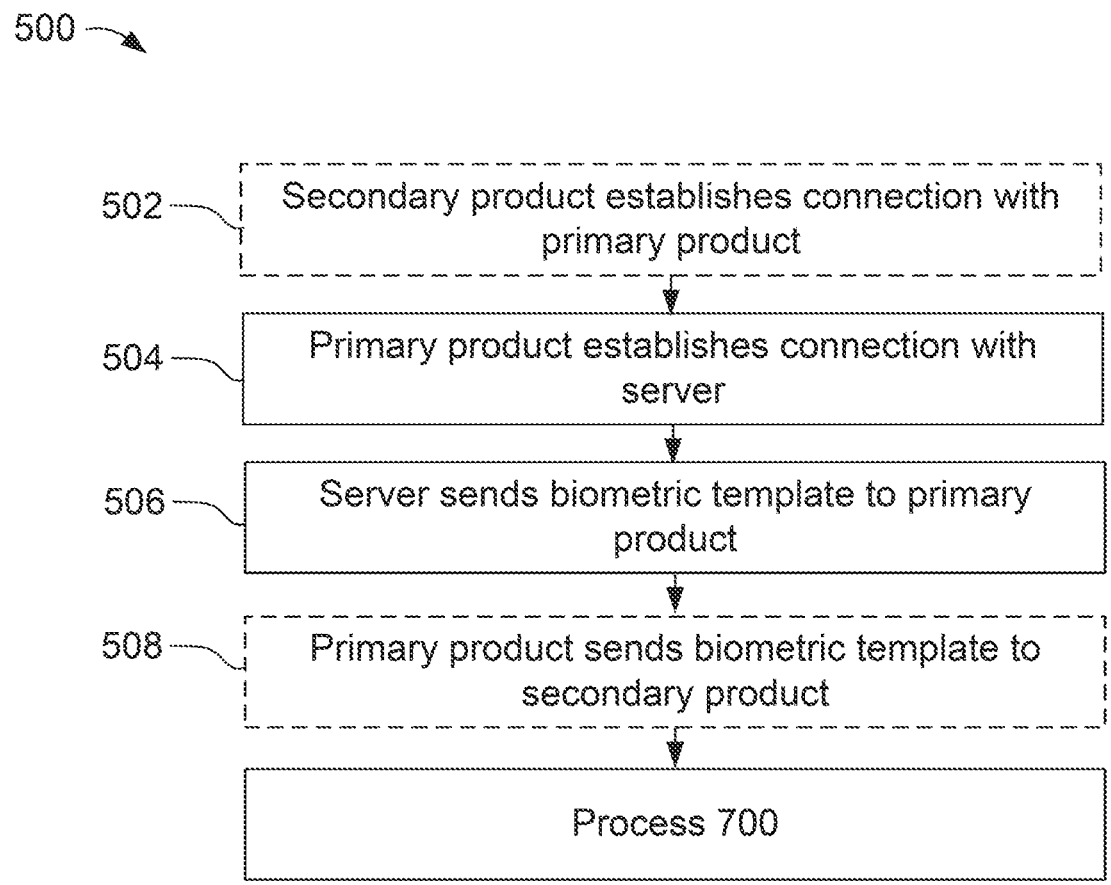
FIG. 15 is a flow diagram of a process for distributing biometric templates throughout the system of FIG. 14, according to an exemplary embodiment.

FIG. 14 illustrates a fourth configuration of the system 100. Referring to FIG. 15, a flow diagram of an illustrative process 400 for distributing biometric templates throughout the system 100 of FIG. 14 is shown, according to an exemplary embodiment. In alternative embodiments, fewer, additional, and/or different steps may be performed. Also, the use of a flow diagram is not meant to be limiting with respect to the order of steps performed.

In this configuration, a product 102, which is shown as primary product 550, is in direct communication with a server 106. In some embodiments, one or more products 102, which are shown as secondary products 552, are in direct communication with the primary product 550. Once the connections between the server 106, the primary product 550, and the secondary products 552 are established, a biometric template is transferred from the server 106 directly to the primary product 550. The primary product 550 then distributes the biometric template to the secondary products 552.

One or more secondary products 552 establish a connection with the primary product 550 (502) and the primary product 550 establishes a connection with the server 106 (504). In some embodiments, the system 100 includes both a primary product 550 and one or more secondary products 552. In some embodiments, the primary product 550 is able to communicate directly with the server 106, while the secondary products 552 can only communicate with the server 106 through the primary product 550. The wireless transceivers 122 of the secondary products 552 and the wireless transceivers 122 of the primary products 550 are configured to communicate with one another directly. By way of example, the wireless transceivers 122 may be configured to communicate with one another through a Bluetooth connection. The secondary products 552 may be further configured to communicate with other secondary products 522, creating a large network of interconnected secondary products 552 that are all connected (e.g., directly, indirectly) with the primary product 550. In other alternative embodiments, the secondary products 552 are omitted, and step 502 is omitted.

The wireless transceiver 122 of the primary product 550 and the network interface 180 of the server 106 are configured to communicate with one another directly. By way of example, the wireless transceiver 122 of the primary product 550 may include a cellular radio that is configured to access the Internet through a cellular network. Once the wireless transceiver 122 has access to the internet, the wireless transceiver 122 may communicate with the server 106 through the network interface 180. Alternatively, the primary product 550 may include a wired network connection that facilitates hardwired communication with the server 106.

The primary product 550, the secondary products 552, and the server 106 may be paired with one another during an initial setup of the system 100. This paring process may utilize user inputs (e.g., passwords, selection of networks, etc.) provided through the user input devices 126. Additionally or alternatively, a user device 104 may be connected to one or more of the primary product 550, the secondary products 552, and the server 106, and the pairing process may utilize user inputs provided through the user input device 156. The primary product 550, the secondary products 552, and the server 106 may then be configured to automatically connect to one another upon startup of the system 100 (e.g., without an input from the user).

The server 106 sends the biometric template to the primary product 550 (506). Specifically, the server 106 transfers a biometric template that has been previously provided to the server 106 to the primary product 550. The biometric template may be generated by a product 102, by a user device 104, or by another type of device (e.g., a dedicated enrollment scanner). The server 106 may additionally send corresponding identification information that identifies the user associated with the biometric template. By way of example, the server 106 may associate each biometric template with a user identification number. This identification information may be used when generating the audit trail to associate an instance of a user accessing a product 102 with the particular user that accessed the product 102. The biometric template and/or the user identification number are stored locally on the primary product 550.

In some embodiments, the server 106 is configured to encrypt the biometric template and/or the user identification information. By way of example, the server 106 may encrypt the package using the product key or the user key that is stored on the server 106. Upon receipt of the encrypted package, the product 102 may decrypt the encrypted package and store the decrypted biometric template and/or user identification information locally. By way of example, the product 102 may decrypted the package using the product key or the user key that is stored on the product 102.

The primary product 550 sends the biometric template to the secondary products 552 (508). Specifically, the primary product 550 transfers the biometric template and/or the user identification information to the secondary products 552 that the primary product 550 communicates with directly. These secondary products 552 store the biometric template and/or the user identification information locally. These secondary products 552 may then send the biometric template and/or the user identification information to other secondary products 552 that (a) they are in direct communication with and (b) have not yet received the biometric template or the user identification information. These other secondary products 552 store the biometric template and/or the user identification information locally. This continues until all of the secondary products 552 in the system 100 have the biometric template and/or the user identification information stored locally. Alternatively, the secondary products 552 may be omitted, and step 508 may be omitted. After all of the primary products 550 and the secondary products have received the biometric template, any of the primary products 550 and the secondary products 552 can complete the process 700.

Figure 17:
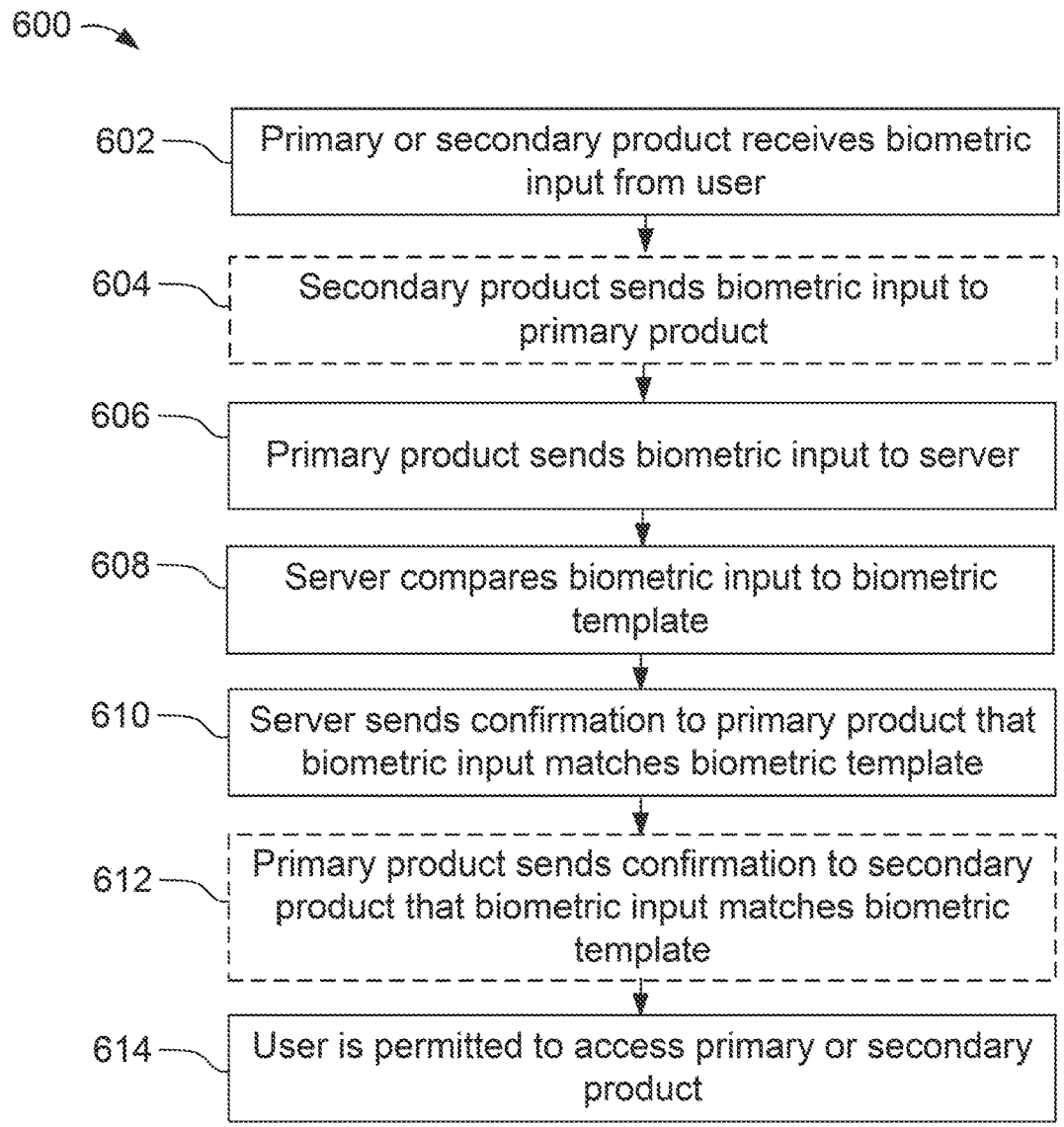
FIG. 17 is a flow diagram of a process for distributing biometric templates throughout the system of FIG. 16, according to an exemplary embodiment.

FIG. 16 illustrates an alternative embodiment of the fourth configuration of the system 100 in which the biometric templates are distributed through a process 600 illustrate in FIG. 17. The system 100 of FIG. 16 is arranged similarly to the system 100 of FIG. 15, but information flows differently. The process 600 may be substantially similar to the process 500 shown in FIG. 15, except as otherwise specified herein.

In the embodiment shown in FIGS. 16 and 17, a user provides a biometric input to the primary product 550 or one of the secondary products 552. If the biometric input was provided to one of the secondary products 552, the secondary product 552 provides the biometric input to the primary product 550. The primary product 550 provides the biometric input to the server 106. The server 106 compares the biometric input to a biometric template and sends a confirmation to the primary product 550 if the biometric input matches the biometric template. If the biometric input was initially received at a secondary product 552, the primary product 550 transfers the confirmation to the secondary product 552. The primary product 550 or secondary product 552 that initially received the biometric input then activates the lock mechanism 128.

The primary product 550 or the secondary product 552 receives a biometric input from the user (602). Depending upon which product 102 the user would like to access, the user selects a primary product 550 or a secondary product 552 and provides a biometric input to that product 102. Step 602 may be substantially similar to step 702 of the process 700 described herein.

The secondary product 552 sends the biometric input to the primary product 550 (604). The secondary product 552 establishes a connection (e.g., a low range connection, a Bluetooth connection, etc.) with the primary product 550. Once a connection is established, the secondary product 552 transfers the biometric input to the primary product 550. If the biometric input was received at the primary product 550, the step 604 is omitted from the process 600. The primary product 550 sends the biometric input to the server 106 (606). The primary product 550 establishes a connection (e.g., a long range connection, a cellular connection, a network connection, etc.) with the server 106. Once the connection is established, the primary product 550 transfers the biometric input to the server 106. In some embodiments, the primary product 550 is configured to encrypt the biometric input prior to sending the biometric input to the server 106 (e.g., using the product key or the user key). The server 106 may then decrypt the encrypted package (e.g., using the product key or the user key).

The server 106 compares the biometric input to a biometric template (608). Once the server 106 has received the biometric input, the server 106 compares the biometric input with one or more biometric templates stored on the server 106, determining if the user should be provided access to the primary product 550 or the secondary product 552. If the server 106 determines that the biometric input does not match a biometric template of an authorized user, the server 106 denies the user access to the primary product 550 or the secondary product 552. If the server 106 determines that the biometric input matches a biometric template of an authorized user, the process proceeds to step 610. Step 608 may be substantially similar to steps 704-714 of the process 700 described herein.

The server 106 sends a confirmation to the primary product 550 that the biometric input matches the biometric template (610). In some embodiments, the server 106 is configured to encrypt the confirmation prior to sending the confirmation to the primary product 550 (e.g., using the product key or the user key). The primary product 550 may then decrypt the encrypted package (e.g., using the product key or the user key). Subsequently, the primary product 550 sends a confirmation to the secondary product 552 that the biometric input matches the biometric template (612). This confirmation indicates that the user that provided the biometric input is an authorized user and should be provided access to the primary product 550 or the secondary product 552 where the biometric input was received. If the biometric input was received at the primary product 550, the step 612 is omitted. The user is permitted to access the primary product 550 or the secondary product 552 (614). Specifically, once the confirmation is received by the primary product 550 or the secondary product 552 that initially received the biometric input from the user, that product 102 is configured to permit the user to access that product 102. Step 614 may be substantially similar to step 716 of the process 700 described herein.

The server 106 may be configured to de-authorize users and/or their corresponding biometric templates from accessing the product 102. In some embodiments, instructions for de-authorizing are contained within the user profile. In other embodiments, the server 106 is configured to receive a command from an administrator to de-authorize one or more users (e.g., through a user device 104). In other embodiments, the server 106 is configured to automatically de-authorize a biometric template and/or a corresponding user. By way of example, the server 106 may automatically de-authorize after a set time period from when the user is enrolled. By way of another example, the server 106 may automatically de-authorize at a certain time and/or date. By way of yet another example, the server 106 may automatically de-authorize after the user has accessed the product 102 a threshold number of times. The set time period, the time and/or date of de-authorization, and the threshold number of accesses may be set by an administrator.

Access Using Biometric Input

Figure 18:
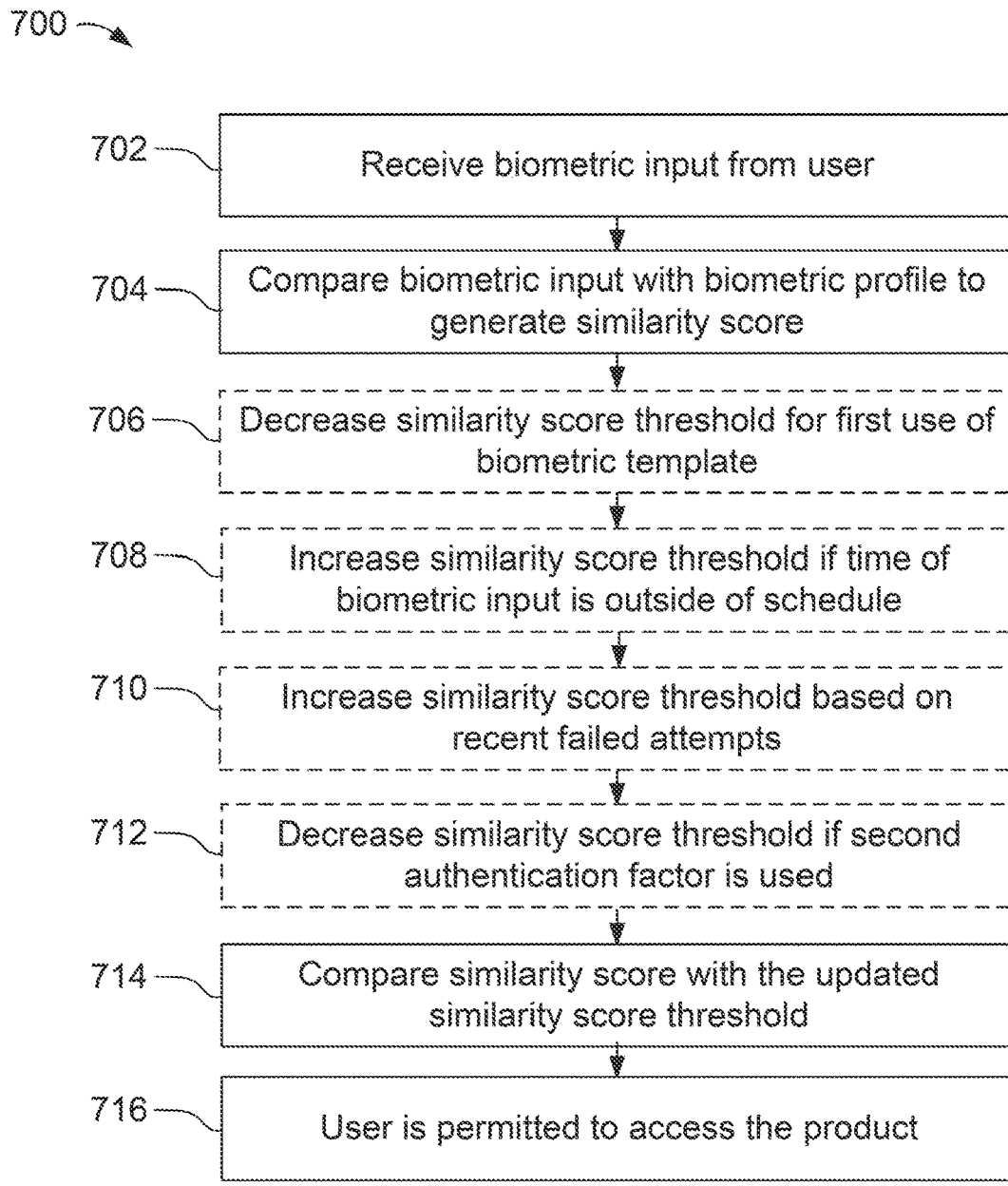
FIG. 18 is a flow diagram of a process for providing a user with access to a product in response to receiving a biometric input, according to an exemplary embodiment.

Referring to FIG. 18, a process 700 for providing a user with access to a product 102 in response to receiving a biometric input is shown according to an exemplary embodiment. When a user provides a biometric input in an attempt to access a product 102, a device of the system 100 (e.g., a product 102, a user device 104, a server 106) compares the biometric input with a biometric template, generating a similarity score. If the similarity score is greater than or equal to a similarity score threshold, the system 100 permits a user to access the product 102 (e.g., opens the lock mechanism 128). If the similarity score is less than the similarity score threshold, the system 100 denies access. The various steps of the process 700 can be completed by any device of the system 100 (e.g., the product 102, the user device 104, the server 106). By way of example, the product 102 may receive the biometric input, and the user device 104 or the server 106 can generate the similarity score and similarity score threshold. By way of another example, the product 102 may complete all of the steps of the process 700 locally. As referred to herein, a device may be a combination of two or more of the product 102, the user device 104, and the server 106.

In some embodiments, the process 700 is configured to vary the similarity score threshold based on a variety of factors to reduce the effectiveness of spoofing attacks. Spoofing is a method of attacking a biometric system. When spoofing, the assailant creates a physical model (e.g., a mold, a 3*d* printed model, a printed image, etc.) that mimics the biometric characteristics of an enrolled user (e.g., the shape of a fingerprint or a face, etc.). The assailant uses the physical model to provide a biometric input with the goal of tricking the system into determining that the biometric input corresponds to the enrolled user.

The product 102 receives a biometric input from a user (702). Specifically, the product 102 receives a biometric input from a user through the biometric interface 124 as an attempt to gain access to the product 102. The product 102 may remain in a low power standby or sleep state until the product 102 is woken. By way of example, the product 102 may be woken when the user touches the product 102 (e.g., interacts with the user input device 126), or when the proximity of the user is automatically detected (e.g., using a proximity sensor, such as a NFC sensor, when the user device 104 establishes a connection with the product 102, etc.). The standby/sleep state may utilize less power (e.g., battery power, grid power, etc.) than when the product 102 is in a fully operational, awake state. The biometric interface 124 may be disabled when in the standby/sleep state. Alternatively, the product 102 may always be in the fully functional state, and may not require being awakened prior to receiving the biometric input.

Alternatively, the user device 104 may receive the biometric input from the user in step 702. The user device 104 may be configured to receive the biometric input through the biometric interface 154. The user device 104 may establish a connection with the product 102 before or after receiving the biometric input. After the biometric input has been received and the connection has been established, the user device 104 may transfer the biometric input to the product 102.

A device of the system 100 compares the biometric input to the biometric template to generate a similarity score (704). The device may convert the biometric input to a mathematical representation. Alternatively, the biometric input may be used in the originally provided form (e.g., an image). The device then selects a biometric template with which to compare the biometric input. If the memory of the device contains only one biometric template, the device selects that biometric template for comparison. If the memory contains multiple biometric templates, the device may compare the biometric input with some or all of the biometric templates and select the biometric template that most closely resembles the biometric input. Alternatively, the device may require the user to provide identifying information (e.g., their name, their identification number, etc.) and select the biometric template corresponding to that user.

Once the biometric template has been selected, the device compares the biometric input to the biometric template and generates a similarity score. The similarity score is a numerical representation of how closely the biometric input matches the selected biometric template. A higher similarity score indicates a closer match. In step 714, the device compares the similarity score against a similarity score threshold. If the similarity score is greater than or equal to the similarity score threshold, the device permits the user to access the product 102. If the similarity score is less than the similarity score threshold, the device denies access to the product 102. In some embodiments, the similarity score threshold is a predetermined value. In other embodiments, the similarity score threshold is varied based on one or more inputs. The default similarity score threshold may be set by an administrator (e.g., to a low, medium, or high value) and increased or decreased according to one or more inputs.

A higher similarity score threshold is more secure (e.g., requires a biometric input that more closely matches the biometric template, preventing spoofing). However, although a lower similarity score threshold is less secure, a lower similarity score threshold provides a greater ease of use for the enrolled user, as it is less likely that a biometric input will result in a similarity score less than the similarity score threshold and require the enrolled user to repeatedly enter their biometric input. Accordingly, it is desirable to vary the similarity level threshold dynamically to thwart spoofing attacks while maximizing the ease of use for the operator.

In some embodiments, the system 100 decreases the similarity score threshold for the first use of the biometric template (706). Specifically, the device may decrease the similarity score threshold if the biometric template that is being compared with the biometric input has not been used by the system 100 previously (e.g., has not been found to match a biometric input previously, has not been compared to a biometric input previously, etc.). Step 706 may be included in embodiments where the biometric interface used to generate the biometric template is different than the biometric interface being used to access the product 102 (e.g., a biometric interface of an enrollment station, a biometric interface 124 of another product 102, a biometric interface 154 of a user device 104, etc.). This may account for any inconsistencies between the biometric interfaces of the different devices. If the device determines that the similarity score is greater than the similarity score threshold and provides the user with access to the product 102, the device may update the biometric template stored in the memory to more closely match the biometric input from the user. The system 100 may then omit the step 706 in subsequent uses of the process 700. In other embodiments, the step 706 is omitted from the process 700 completely.

In some embodiments, the system 100 increases the similarity score threshold if the time of the biometric input is outside of a schedule (708). The schedule may include first periods of time (e.g., active periods) where the user is expected to access the product 102 and second periods of time (e.g., inactive periods) where the user is not expected to access the product. The schedule may repeat every day, every week, or every year. The schedule may apply to all of the enrolled users of a product 102. Alternatively, the schedule may be customized for each user that is enrolled on the product 102.

The schedule may be set by an administrator through a product 102, a user device 104, or the server 106. By way of example, the administrator may create the schedule for a product 102 or user on the user device 104 and transfer it directly to the product 102. By way of another example, the administrator may create the schedule for the product 102 or user on the user device 104 and transfer it to the server 106. The server 106 may store the schedules for multiple users and/or products 102. The server 106 may transfer the schedule to each of the corresponding products 102 and/or to each of the products 102 that can be accessed by the corresponding users. In some embodiments, the schedule is part of the user profile.

Alternatively, the device may be configured to determine the schedule based upon the usage patterns of the product 102. The device may operate over a trial period (e.g., a day, a week, a month, etc.), recording when users access the product 102. If the device is developing a schedule for the product 102 overall, then the device may not differentiate between different users. If the device is developing a schedule for each user enrolled on the product 102, then the device may record which users are associated with each of the access attempts. After the trial period has expired, the device may determine the active periods and inactive periods of the schedule based upon the recorded access data.

If an access attempt occurs within an active period of the schedule, then the device may decrease the similarity score threshold or leave it unchanged. If an access attempt occurs within an inactive period of the schedule, then the device may increase the similarity score threshold or leave it unchanged. This increases the resistance of the system 100 to spoofing during periods when the users would not normally attempt to access the product 102 (e.g., at night, on weekends, etc.). This is beneficial both (a) because the spoofing assailants may be more likely to attempt to access the product 102 when the users are not present and (b) because the users will likely not be affected by the decreased ease of use during the inactive periods. In other embodiments, the step 708 is omitted from the process 700.

In some embodiments, the system 100 increases the similarity score threshold based on recent failed attempts (710). Specifically, the device tracks previous failed attempts to access the product 102 (e.g., where the similarity score for a biometric input was less than the similarity score threshold) and the times at which the attempts occurred. In some embodiments, if greater than a threshold number of failed attempts occur within a predetermined recent time period (e.g., from one minute, five minutes, an hour, etc. prior to the current time up to the current time), the device may initiate a timeout period, in which the product 102 is disabled (i.e., cannot be accessed). The length of the timeout period may temporarily increase and/or the threshold number of failed attempts may temporarily decrease after the timeout period is completed, increasing the period of time necessary for an assailant to repeatedly attempt to access the product 102. Additionally or alternatively, if greater than the threshold number of failed attempts occur within the predetermined time period, the device may increase the similarity score threshold. The threshold number of failed attempts and the predetermined time period required to trigger the timeout may be the same as or different than the threshold number of failed attempts and the predetermined time period required to trigger the increase in the similarity score threshold. The device may return the similarity score threshold to the nominal value (e.g., the value before the similarity score threshold was increased in response to the failed attempts) after a user provides a biometric input having a similarity score greater than the similarity score threshold. In other embodiments, the step 710 is omitted from the process 700.

In some embodiments, the system 100 decreases the similarity score threshold if a second authentication factor is used (712). The first authentication factor may be the biometric input from the user (e.g., provided at the user device 104 or the product 102). In some embodiments, the second authentication factor is a credential provided by the user. The credential confirms the identity of the user as an authorized user or confirms that the user possesses information that is distributed only by authorized users. The credential may be provided by the user through the user input device 126 or the user input device 156. By way of example, the credential may be a key code provided through a keypad (e.g., a physical keypad, and on-screen keypad, etc.). By way of another example, the credential may be a swiping pattern provided through a touchscreen (e.g., connecting a series of dots with lines in a specific order, etc.). By way of another example, the credential may be a specific phrase (e.g., a password, an answer to a security question, etc.) provided through an on-screen keyboard. Alternatively, the credential may be provided by the user through the biometric interface 124 or the biometric interface 154. By way of example, the credential may be a scan of a fingerprint, a retina, or a face or a recording of a voice (e.g., saying a specific phrase). In such embodiments, the biometric input of the first authentication factor may be a different type of biometric input than the second authentication factor (e.g., a fingerprint vs a voice recording). In other embodiments, the first authentication factor is the distribution of the user key and the second authentication factor is a credential provided by the user, as described herein with respect to the process 800.

The device verifies or validates the credential. In response to the second authentication factor matching an authorized credential, the device may decrease the similarity score threshold. In some embodiments, providing the second authentication factor is optional. Accordingly, the user may be permitted to access the product 102 without providing the second authentication factor, however, the similarity score threshold may be higher if the user elects to do so. If the user is having difficulty meeting the similarity score threshold to access the product 102, the user may elect to provide the second authentication factor, decreasing the similarity score threshold. In other embodiments, the step 712 is omitted from the process 700.

The device compares the similarity score with the updated similarity score threshold (714). If the similarity score is greater than or equal to the updated similarity score threshold (e.g., the similarity score threshold modified according to steps 706-712), the biometric input matches the biometric template and the device permits the user to access the product 102 (e.g., opens the lock mechanism 128). If the similarity score is less than the updated similarity score threshold, the biometric input does not match the biometric template and the device denies the user access to the product 102, and the attempt to access the product 102 has failed. The user may then provide another biometric input to attempt to access the product 102 once again.

The user is permitted to access the product 102 (716). In some embodiments, when the user is permitted to access the product 102, the product 102 activates the lock mechanism 128 (e.g., opens or unlocks the lock mechanism 128). When the lock mechanism 128 is opened, the product 102 permits the user to access the item, equipment, or space that the product 102 is configured to protect. By way of example, when opening, the lock mechanism 128 may release a shackle that would otherwise hold two chains together, preventing removal of an object (e.g., a bicycle, a ladder, etc.). By way of another example, when opening, the lock mechanism 128 may release a bolt that prevents opening of a door (e.g., on a safe, on a door of a home, etc.). In other embodiments, when the user is permitted to access the product 716, the product 102 permits the user to access one or more files stored on the product 102.

Two Factor Authentication

Figure 19:
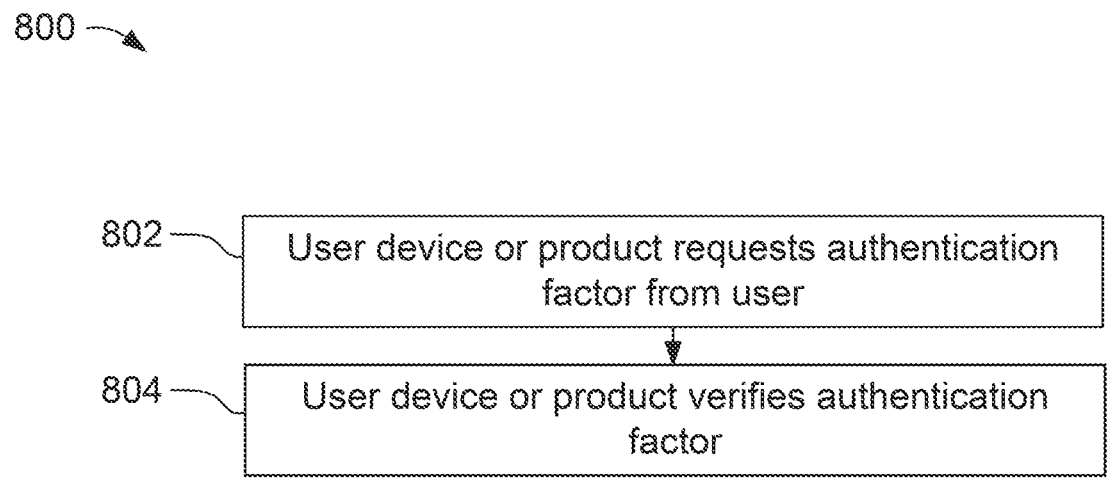
FIG. 19 is a flow diagram of a process for authenticating a user request, according to an exemplary embodiment.

Referring to FIG. 19, a process 800 for authenticating a user request is shown according to an exemplary embodiment. The process 800 is usable with the other processes described herein (e.g., the process 200) to implement a two factor authentication system, thereby securing the system 100 against unauthorized access. In the two factor authentication system, one factor (e.g., the first factor or the second factor) is the use of an encrypted user profile and encrypted command to authorize a specific user device 104 to issue commands to a product 102. For example, an encrypted package including a user profile and a user key, with a user key appended thereto, is distributed to the user device 104 by the server 106. The encrypted package is distributed to the product 102 by the user device 104. Specifically, the encrypted package is encrypted using a product key that is unique to the product 102 and/or a handshake nonce. The product 102 decrypts the encrypted package using the product key that is stored on the product 102 and, in some embodiments, the handshake nonce, providing the user key to the product 102. A command sent from the user device 104 to the product 102 may then be subsequently encrypted using the user key stored on the user device 104 and, in some embodiments, a modified reply nonce (generated based on a reply nonce received from the product 102), and the product 102 decrypts the encrypted command using the user key retrieved from the encrypted package and/or the modified reply nonce generated independently by the product 102. Accordingly, the server 106 can control which user devices 104 are permitted to issue commands to each product 102 by controlling the distribution of the user keys. Another factor (e.g., the first factor or the second factor) is a credential provided by a user (e.g., a manual input such as a biometric input or a key code). This factor ensures that only authorized users can issue commands to a product, preventing an unauthorized user from using an authorized device to access a product 102.

The user device 104 or the product 102 requests an authentication factor from the user (802). The request for the authentication factor may be made before or after the transmission of the encrypted package and encrypted command to the product 102 from the user device 104 (i.e., the authentication factor may be the first factor or the second factor). In order to confirm that a user is authorized, the user device 104 requests a credential or authentication factor from a user. The user device 104 may request the credential by issuing a notification (e.g., an on-screen notification, illuminating a light, making a specific noise, etc.). The credential confirms the identity of the user as an authorized user or confirms that the user possesses information that is distributed only by authorized users. The credential may be provided by the user through the user input device 156. By way of example, the credential may be a key code provided through a keypad (e.g., a physical keypad, and on-screen keypad, etc.). By way of another example, the credential may be a swiping pattern provided through a touchscreen (e.g., connecting a series of dots with lines in a specific order, etc.). By way of another example, the credential may be a specific phrase (e.g., a password, an answer to a security question, etc.) provided through an on-screen keyboard. Alternatively, the credential may be provided by the user through the biometric interface 154. By way of example, the credential may be a scan of a fingerprint, a retina, or a face or a recording of a voice (e.g., saying a specific phrase).

Alternatively, the product 102 may request the credential from the user. Similarly, the product 102 may request the credential by issuing a notification. The credential may be provided by the user through the user input device 126 or through the biometric interface 124. Further alternatively, one of the user device 104 and the product 102 may request the credential, and the other of the user device 104 and the product 102 may receive the authentication factor. By way of example, an application of the user device 104 may provide an on-screen notification that the user should provide a key code on a keypad of the product 102. Further alternatively, the server 106 may request the credential from the user. By way of example, the server 106 may send a command to the user device 104 to request the credential (e.g., by issuing a notification).

The user device 104 or the product 102 verifies or validates the authentication factor (804). Specifically, the user device 104 is configured to compare the credential with one or more authorized credentials to determine if the user device 104 should verify the authentication factor. The user device 104 may store the authorized credentials (e.g., biometric templates, passwords, key codes, etc.) in the memory 144. In other embodiments, the authorized credentials are stored in the server 106, and the user device 104 (a) retrieves the authorized credentials from the server 106 or (b) sends the credential provided by the user to the server 106, and the server 106 compares the credential to the authorized credentials and sends the result of the comparison back to the user device 104. In yet other embodiments, the product 102 compares the credential with one or more authorized credentials stored in the memory 114. Any of the processes described herein with respect to the distribution of biometric templates throughout the system 100 may also be used to distribute the authorized credentials throughout the system 100. If the credential matches one of the authorized credentials, the process 800 is completed, and the system 100 continues with the rest of the process in which the process 800 is implemented (e.g., the process 200). If the credential does not match one of the authorized credentials, the system 100 denies the user access to the product 102.

Referring to FIG. 7, in some embodiments, the process 800 is implemented within the process 200. In one embodiment, the process 800 is implemented after the step 204, in which the encrypted package and the unencrypted user key are transferred to the user device 104. If the credential provided by the user matches the authorized credential, the process 200 continues to step 206, and the user device 104 is permitted to transfer the encrypted package to another user device 104 or to a product 102.

In some embodiments, the system 100 performs the process 800 (e.g., requires the second authentication factor) only when the user attempts to access specific products 102. By way of example, a user may wish to implement a two factor authentication system when protecting certain sensitive items (e.g., money, documents, firearms, etc.). In some embodiments, the user activates a setting that requires the two factor authentication (e.g., during setup). The requirement for two factor authentication may be distributed from the server 106 to the product 102 in the user profile. In other embodiments, the manufacturer automatically activates the two factor authentication setting for certain types of products 102 (e.g., safes).

Security

Unlike a password, a user's biometric information cannot be easily reset if it is compromised (e.g., obtained by an unauthorized party). Accordingly, it is desirable to secure the user's information against theft. In some embodiments, the devices of the system 100 are configured to encrypt the biometric inputs and the biometric templates immediately upon their generation. In this encrypted form, it may be extremely difficult to generate a representation of the user's biometric information (e.g., their fingerprint) from the biometric input or the biometric template stored on the device. In this way, even if an assailant can remove the biometric templates or biometric inputs from the device, the user's biometric information is not compromised.

Additionally, the product 102 may be configured to erase all user data (e.g., biometric templates, biometric inputs, user profiles, etc.) stored on the product 102 in certain circumstances. By way of example, the product 102 may be configured to erase all user data stored on the product 102 in response to receiving a de-authorization message or code (e.g., from the user device 104 or the server 106, locally through a keypad, etc.). By way of another example, the product 102 may be configured to erase all user data stored on the product 102 after a set time period. By way of another example, the product 102 may be configured to erase all user data stored on the product 102 after the product 102 has been used a threshold number of times. In some embodiments, each access attempt by a user is considered a use. In other embodiments, each time that the product 102 unlocks is considered a use. In some embodiments, the product 102 is configured to erase all user data stored on the product 102 in response to a threshold time period elapsing between uses of the product 102. By way of another example, the product 102 may be configured to erase all user data stored on the product 102 in response to the product 102 experiencing a loss of power while the lock mechanism 128 is locked. In one such example, the product 102 waits for a delay period to pass after losing power before erasing the user data. Such a delay period may facilitate changing a battery of the product 102 without having the user data erased. The length of the set time period, the threshold number of uses, the threshold time period between uses, and the delay period may be set by an administrator (e.g., through an interaction with the user device 104).

In some embodiments, the product 102 includes a tamper sensor configured to detect a tamper event (e.g., an unauthorized user attempting to force their way into the product 102). The tamper sensor may be a shock sensor (e.g., an accelerometer configured to detect a blow to the product 102), an optical sensor (e.g., a sensor that detects when the shackle 132 of the product 102 has been opened), or another type of sensor. The tamper sensor may be used with other information (e.g., a current locked or unlocked state of the product 102) to determine if a tamper event has occurred. In some embodiments, the product 102 may be configured to erase all user data stored on the product 102 in response to experiencing a tamper event. One or more features of the product 102 may be configured to resist tampering. By way of example, the internal components of the product 102 (e.g., the processing circuit 110, the biometric interface 124, etc.) may be coated, potted, encapsulated or otherwise covered (e.g., with an epoxy resin) to prevent manipulation of the components.

Reference in this specification to "one embodiment," "some embodiments," or "an embodiment" means that a particular feature, structure, or characteristic described in connection with the embodiment is included in at least one embodiment. The appearance of the phrase "in one embodiment" or "in some embodiments" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments within the scope of the present disclosure include program products comprising machine-readable storage media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions. While a computer or machine-readable storage medium is not a propagated signal (i.e., is tangible and non-transitory), a computer or machine-readable storage medium can be a source or destination of computer program instructions encoded in an artificially-generated and propagated signal.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, mobile phones, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

The invention claimed is:

1. A lock system comprising:
   a lock assembly for unlocking a door deadbolt, the lock assembly including a keypad device; and
   a non-transitory computer-readable medium for an electronic device, the non-transitory computer-readable medium having instructions encoded therein, the instructions when executed by a first processor of the electronic device cause the first processor to:
      receive a request to enter the lock assembly into a biometric enrollment mode; and
      transmit, via a first wireless transceiver of the electronic device, a first signal to enter the keypad device into the biometric enrollment mode;
   wherein the keypad device includes:
      a biometric interface configured to receive biometric inputs;
      a second wireless transceiver configured to receive the first signal;
      a memory; and
      a second processor configured to:
         activate the biometric enrollment mode in response to receiving the first signal;
         receive one or more first biometric inputs acquired via the biometric interface;
         generate a biometric template based on the one or more first biometric inputs;
         store the biometric template within the memory;
         receive a second biometric input acquired via the biometric interface;
         compare the second biometric input to the biometric template; and
         activate the door deadbolt to unlock a door associated with the door deadbolt in response to the second biometric input matching the biometric template.

2. The lock system of claim 1, wherein the first signal is transmitted directly to the second wireless transceiver of the lock assembly from the first wireless transceiver of the electronic device.

3. The lock system of claim 1, wherein the second processor is configured to transmit, via the second wireless transceiver, a second signal indicating the biometric template was successfully generated and stored.

4. The lock system of claim 1, wherein the electronic device is a portable electronic device.

5. The lock system of claim 1, wherein the biometric interface is a fingerprint scanner.

6. The lock system of claim 1, wherein the keypad device is configured to receive a passcode input.

7. The lock system of claim 6, wherein the lock assembly includes a keyhole.

8. The lock system of claim 6, wherein the memory is configured to store a passcode, and wherein the second processor is configured to wirelessly activate the door deadbolt to unlock the lock assembly in response to the passcode input matching the passcode.

9. The lock system of claim 1, wherein the instructions cause the first processor to require a valid user credential prior to engaging in certain communications with the lock assembly, the valid user credential including at least one of a passcode or a biometric.

10. The lock system of claim 9, wherein the valid user credential includes the biometric, and wherein the biometric includes at least one of a fingerprint or a facial scan.

11. The lock system of claim 9, wherein the certain communications include the first signal.

12. The lock system of claim 9, wherein the certain communications include a second signal different than the first signal, wherein the second signal is an unlock command to unlock the deadbolt via the electronic device.

13. A lock system for a door deadbolt, the lock system comprising:
    a keypad device including:
       a biometric interface configured to acquire biometric inputs;
       a keypad;
       a wireless transceiver;
       a memory configured to store one or more passcodes and one or more biometric templates; and
       a processor configured to:
          activate a biometric enrollment mode in response to receiving an enrollment signal from an external device to enter the biometric enrollment mode;
          receive one or more first biometric inputs acquired via the biometric interface;
          generate a biometric template based on the one or more first biometric inputs;
          store the biometric template within the memory;
          receive a second biometric input acquired via the biometric interface;
          activate the door deadbolt to unlock the door deadbolt in response to the second biometric input matching the biometric template within the memory;
          receive touch inputs acquired via the keypad; and
          activate the door deadbolt to unlock the door deadbolt in response to the touch inputs matching a respective passcode of the one or more passcodes stored within the memory.

14. A method comprising:
    receiving, by a portable electronic device, a request to enter a keypad device into a biometric enrollment mode;
    transmitting, by the portable electronic device, a first signal to enter the keypad device into the biometric enrollment mode;
    activating, by the keypad device, the biometric enrollment mode in response to receiving the first signal;
    receiving, by a biometric interface of the keypad device, one or more first biometric inputs acquired via the biometric interface;
    generating, by the keypad device, a biometric template based on the one or more first biometric inputs;
    storing, by the keypad device, the biometric template within a memory thereof;
    receiving, by the biometric interface of the keypad device, a second biometric input; and activating, by the keypad device, a door deadbolt associated therewith in response to the second biometric input matching the biometric template within the memory to facilitate unlocking the door deadbolt.

15. The method of claim 14, wherein the portable electronic device includes one or more processors and one or more memory devices, the one or more memory devices storing instructions that cause the one or more processors to require a valid user credential prior to engaging in certain communications with the locking device.

16. The method of claim 15, further comprising:
acquiring, by the portable electronic device, the valid user credential;
transmitting, by the portable electronic device, an unlock command to the door deadbolt after acquisition of the valid user credential; and
unlocking, by the door deadbolt, a locking mechanism thereof at least in response to receiving the unlock command.

17. The method of claim 16, wherein the valid user credential includes a biometric.

\* \* \* \* \*